(12) United States Patent
Gould

(10) Patent No.: US 11,055,074 B2
(45) Date of Patent: Jul. 6, 2021

(54) KEY-BASED LOGGING FOR PROCESSING OF STRUCTURED DATA ITEMS WITH EXECUTABLE LOGIC

(71) Applicant: Ab Initio Technology LLC, Lexington, MA (US)

(72) Inventor: Joel Gould, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 40 days.

(21) Appl. No.: 15/853,000

(22) Filed: Dec. 22, 2017

(65) Prior Publication Data

US 2019/0146763 A1 May 16, 2019

Related U.S. Application Data

(60) Provisional application No. 62/585,362, filed on Nov. 13, 2017.

(51) Int. Cl.
| | |
|---|---|
| *G06F 15/16* | (2006.01) |
| *H04L 29/06* | (2006.01) |
| *G06F 8/41* | (2018.01) |
| *G06F 21/55* | (2013.01) |
| *G06F 8/34* | (2018.01) |
| *G06F 16/2455* | (2019.01) |

(Continued)

(52) U.S. Cl.
CPC ............ *G06F 8/433* (2013.01); *G06F 8/34* (2013.01); *G06F 16/116* (2019.01); *G06F 16/13* (2019.01); *G06F 16/24568* (2019.01); *G06F 16/285* (2019.01); *G06F 21/552* (2013.01)

(58) Field of Classification Search
CPC ....................................................... G06F 8/443
See application file for complete search history.

(56) References Cited

U.S. PATENT DOCUMENTS

| | | | |
|---|---|---|---|
| 5,966,072 A | 10/1999 | Stanfill et al. | |
| 7,266,764 B1* | 9/2007 | Flam ..................... | G06F 3/0482 715/209 |

(Continued)

OTHER PUBLICATIONS

"Set Group Intervals in Reports," retrieved from uvm.edu/bnelson/computer/access2002/setgroupintervalsinreports.html, Aug. 9, 2017.

(Continued)

*Primary Examiner* — Lewis A Bullock, Jr.
*Assistant Examiner* — Mohammad H Kabir
(74) *Attorney, Agent, or Firm* — Fish & Richardson P.C.

(57) ABSTRACT

A data processing system for identifying one or more portions of executable logic that are executed in processing one or more data items that are each associated with a given value of a key by accessing the specification that represents the executable logic; and generating a log record for the given value of the key, the generating including: for each of the one or more of the data items associated with the given value of the key: identifying a given state of the specification that is maintained for the given value of the key associated with that data item; processing that data item including executing, on that data item, executable logic that are specified in the identified given state of the specification; and generating the log record specifying the execution of those one or more portions of the executable logic for that given value of the key.

78 Claims, 21 Drawing Sheets

(51) Int. Cl.
*G06F 16/28* (2019.01)
*G06F 16/11* (2019.01)
*G06F 16/13* (2019.01)

(56) References Cited

U.S. PATENT DOCUMENTS

| | | | |
|---|---|---|---|
| 7,877,350 B2 | 1/2011 | Stanfill et al. | |
| 9,460,277 B2 | 10/2016 | Bolik et al. | |
| 9,674,249 B1* | 6/2017 | Kekre | H04L 65/60 |
| 2002/0120919 A1 | 8/2002 | Aizenbud-Reshef | |
| 2005/0050513 A1* | 3/2005 | Motoyama | G06F 8/10 |
| | | | 717/106 |
| 2005/0144189 A1* | 6/2005 | Edwards | G06F 16/185 |
| 2009/0327196 A1 | 12/2009 | Studer et al. | |
| 2012/0117550 A1* | 5/2012 | Chamley | G06F 8/443 |
| | | | 717/148 |
| 2013/0205286 A1* | 8/2013 | Barraclough | G06F 8/443 |
| | | | 717/151 |
| 2015/0106818 A1 | 4/2015 | Atterbury | |
| 2016/0350155 A1* | 12/2016 | Brutschy | G06F 9/44589 |
| 2018/0101609 A1* | 4/2018 | Manzano Macho | H04L 43/02 |
| 2018/0157713 A1* | 6/2018 | Huang | G06F 16/24568 |

OTHER PUBLICATIONS

"Reviewing the audit log for your organization," retrieved from help.github.com/articles/reviewing-the-audit-log-for-your-organization/, Aug. 9, 2017.
"Logging," retrieved from docs.tibco.com/put/amx-bpm4.0.0/doc/html/bpmhelp/Concepts/GUID-EA1C9D66, Jul. 17, 2017.
"Logging and Auditing," retrieved from docs.tibco.com/put/amx-bpm4.0.0/doc/html/bpmhelp/Concepts/GUID-EF4A6CE7, Jul. 17, 2017.
"Auditing," retrieved from docs.tibco.com/put/amx-bpm4.0.0/doc/html/bpmhelp/Concepts/GUID-E33F4738, Jul. 17, 2017.
International Search Report and Written Opinion issued in PCT/US2018/060670, dated Apr. 8, 2019.
David et al., "Data Flow program Graphs", Computer, IEEE Computer Society, USA vol. 40, No. 2, pp. 26-41 (1982).
Lee et al., "Data Flow Process Networks", Proceedings of the IEEE, vol. 83, No. 5, pp. 773-799 (1995).
International Preliminary Report on Patentability in PCT Appln. No. PCT/US2018/060670, dated May 19, 2020, 11 pages.

* cited by examiner

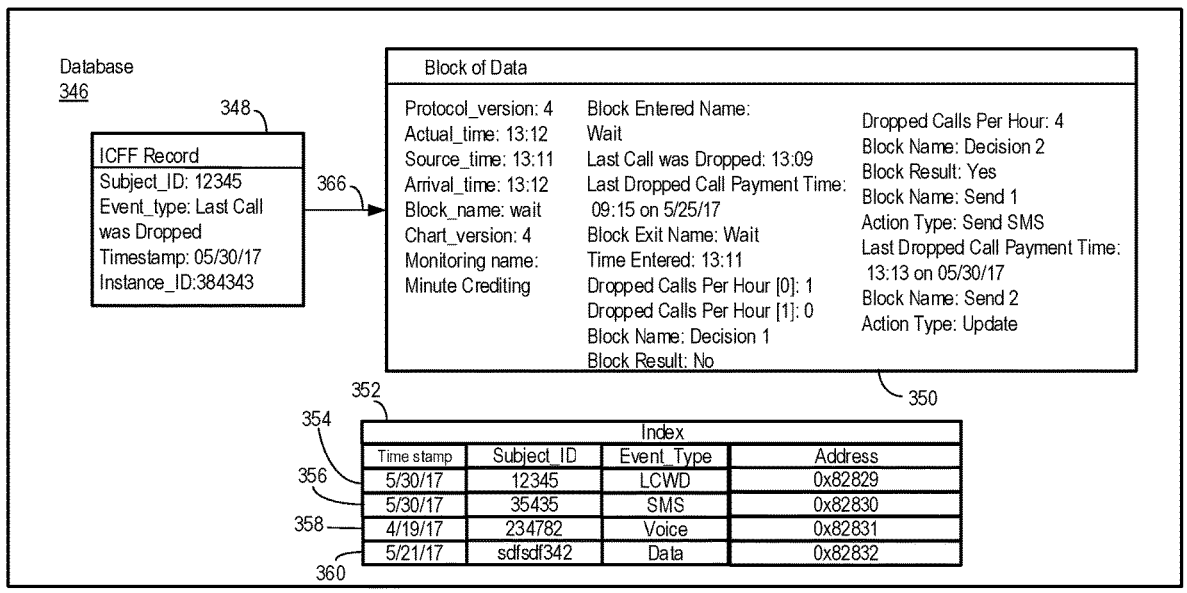
FIG. 7H (con't)

KEY-BASED LOGGING FOR PROCESSING OF STRUCTURED DATA ITEMS WITH EXECUTABLE LOGIC

CLAIM OF PRIORITY

This application claims priority under 35 U.S.C. § 119(e) to provisional U.S. Patent Applications 62/585,362, filed on Nov. 13, 2017, the entire contents of which are hereby incorporated by reference.

TECHNICAL FIELD

The present description relates to computer-implemented methods, data processing systems and machine-readable hardware storage devices for generating key-specific logs from execution of executable logic that is currently applied to one or more keyed data items in a stream of data items, e.g., data items coming in via a network connection from networked applications.

BACKGROUND

A log records either events that occur in an operating system or other software runs, or messages between different users of a communication software.

SUMMARY

In a general aspect 1, described is a method implemented by a data processing system for identifying one or more portions of executable logic that are executed in processing one or more data items that are each associated with a given value of a key, wherein a specification represents the executable logic, wherein the specification is associated with the key and wherein states of the specification are maintained for respective values of the key, the method including: accessing the specification that represents the executable logic, wherein a state of the specification for a particular value of the key specifies one or more portions of the executable logic that are executable in that state; intermittently receiving, over an input device or port, data items of a stream of data, with one or more of the data items each being associated with the given value of the key; and generating a log record for the given value of the key, with the log record specifying the one or more portions of the executable logic that are executed in processing the one or more of the data items that are each associated with the given value of the key, the generating including: for each of the one or more of the data items associated with the given value of the key: identifying a given state of the specification that is maintained for the given value of the key associated with that data item; processing, by the data processing system, that data item including executing, on that data item, one or more portions of executable logic that are specified in the identified given state of the specification; and generating the log record specifying the execution of those one or more portions of the executable logic for that given value of the key.

In an aspect 2 according to aspect 1, the method further includes grouping log records together by key, wherein first log records associated with a first key are grouped into a first group and wherein second log records associated with a second key are grouped into a second group.

In an aspect 3 according to any one of aspects 1 to 2, the log records are grouped in memory.

In an aspect 4 according to any one of aspects 1 to 3, each log record includes one or more fields indicative of one or more attributes of processing a data item, wherein, for at least one log record, a field is a key field specifying a value of key associated with the data item.

In an aspect 5 according to any one of aspects 1 to 4, a subset of log records associated with a particular key do not include the key field.

In an aspect 6 according to any one of aspects 1 to 5, only one log record associated with a particular key includes the key field.

In an aspect 7 according to any one of aspects 1 to 6, the method further includes writing log records in a particular group associated with a particular key to a file at an end of pre-defined time interval.

In an aspect 8 according to any one of aspects 1 to 7, the method further includes reformatting the file; writing the reformatted file into an indexed compressed flat file (ICFF); and indexing the ICFF in an index by key.

In an aspect 9 according to any one of aspects 1 to 8, the specification includes a chart with a plurality of nodes, wherein each node represents one or more portions of the executable logic, wherein the chart is executable, wherein execution of the chart causes execution of portions of the executable logic, and the method further includes: based on the log records, tracing traversal through one or more nodes of the chart in processing the one or more data items.

In an aspect 10 according to any one of aspects 1 to 9, the method includes parsing the log records to identify which nodes of the chart are traversed and which nodes of the chart are not traversed.

In an aspect 11 according to any one of aspects 1 to 10, the log records specify which nodes of the chart are traversed and which nodes of the chart are not traversed.

In an aspect 12 according to any one of aspects 1 to 11, the method includes receiving a user-initiated selection of one of the nodes; in response to receiving the selection, causing a configuration area to be displayed on a graphical user interface that provides a configuration means for the user to configure the one or more portions of the executable logic represented by selected node, wherein the configuration means includes means to turn on and off auditing; and receiving user-initiated turning on of the auditing via the configuration means causing the generating of the log record that is associated with the selected node.

In an aspect 13 according to any one of aspects 1 to 12, the generating of the log record specifying the execution of those one or more portions of the executable logic for that given value of the key includes: specifying in the generated log record an outcome of the execution of those one or more portions of the executable logic, specifying variables that are read or set upon the execution of those one or more portions of the executable logic, or identifying those one or more portions of the executable logic that are executed.

In an aspect 14 according to any one of aspects 1 to 13, the method further includes: in response to executing the one or more portions of the executable logic, initiating an action to be executed by a computing system.

In an aspect 15 according to any one of aspects 1 to 14, the action includes requesting additional computational resources for the execution of the one or more portions of executable logic based on an execution characteristic of the execution of the one or more portions of executable logic.

In an aspect 16 according to any one of aspects 1 to 15, the method further includes: maintaining the states by storing, in a data repository or in an in-memory data grid, state data indicative of which portion of the executable logic is currently being executed for each state.

In an aspect 17 according to any one of aspects 1 to 16, the method further includes: in response to completing the processing of the one or more of the data items that are each associated with the given value of the key, updating the state data to specify a current state for that value of the key.

In an aspect 18 according to any one of aspects 1 to 17, the method further includes: dynamically determining metrics indicative of which nodes of the chart are traversed and how many times the traversed nodes are traversed by the data items.

In an aspect 19 according to any one of aspects 1 to 18, the method further includes: generating a stream of log records documenting paths taken through the chart; transforming the generated log records; and storing the transformed log records in a relational database or in an index compressed flat file including batching log records together at a specified granularity.

In an aspect 20 according to any one of aspects 1 to 19, the method further includes: dynamically outputting the determined metrics via a user interface, wherein the outputted metrics are updated in response to a change to the determined metrics.

In an aspect 21 according to any one of aspects 1 to 20, the method further includes: receiving a user selection of a first one of the data items of the stream; and causing display of an indication of the one or more portions of the executable logic currently being executed on the selected first one of the data items.

In an aspect 22 according to any one of aspects 1 to 21, the method further includes: comparing the selected first one of the data items of the stream currently being processed with a predetermined reference data item; determining if a deviation exists between the first one of the data items of the stream currently being processed and the predetermined reference data item or if such a deviation does not exist; and outputting an indication whether the first one of the data items of the stream currently being processed is in agreement with the predetermined reference data item based on the determining if a deviation exists between the first one of the data items of the stream currently being processed and the predetermined reference data item or if such a deviation does not exist.

In an aspect 23 according to any one of aspects 1 to 22, the method further includes: comparing the one or more portions of the executable logic currently being executed on the first one of the data items with a predetermined reference executable logic; determining if a deviation exists between the one or more portions of the executable logic currently being executed on the first one of the data items and the predetermined reference executable logic or if such a deviation does not exist; and outputting an indication whether the or more portions of the executable logic currently being executed on the first one of the data items is in agreement with the predetermined reference executable logic based on the determining if a deviation exists between the one or more portions of the executable logic currently being executed on the first one of the data items and the predetermined reference executable logic or if such a deviation does not exist.

In an aspect 24 according to any one of aspects 1 to 23, a log record is a structured data record with a first field for storing data representing a state of the specification for a particular value of the key and a second field for storing data specifying which portions of the executable logic represented by the specification have been executed, from a time at which execution of the executable logic is started to at a current time, for that particular value of the key.

In an aspect 25 according to any one of aspects 1 to 24, a log record is a structured data record with a field for storing data specifying which portion of the executable logic represented by the specification has been executed at a current time for a particular value of the key.

In an aspect 26 according to any one of aspects 1 to 25, the specification is a chart, and wherein one or more log records specify a path through the chart that represents which portions of the executable logic are executed in processing one or more data records associated with a particular value of the key.

In an aspect 27 according to any one of aspects 1 to 26, the method further includes generating one or more output records based on processing of one or data items; wherein each of the one or more output records includes data not included in the log record.

In a general aspect 28, described is a data processing system for identifying one or more portions of executable logic that are executed in processing one or more data items that are each associated with a given value of a key, wherein a specification represents the executable logic, wherein the specification is associated with the key and wherein states of the specification are maintained for respective values of the key, the data processing system including one or more processing devices; and one or more machine-readable hardware storage devices storing instructions that are executable by the one or more processing devices to perform operations including: accessing the specification that represents the executable logic, wherein a state of the specification for a particular value of the key specifies one or more portions of the executable logic that are executable in that state; intermittently receiving, over an input device or port, data items of a stream of data, with one or more of the data items each being associated with the given value of the key; and generating a log record for the given value of the key, with the log record specifying the one or more portions of the executable logic that are executed in processing the one or more of the data items that are each associated with the given value of the key, the generating including: for each of the one or more of the data items associated with the given value of the key: identifying a given state of the specification that is maintained for the given value of the key associated with that data item; processing, by the data processing system, that data item including executing, on that data item, one or more portions of executable logic that are specified in the identified given state of the specification; and generating the log record specifying the execution of those one or more portions of the executable logic for that given value of the key.

In an aspect 29 according to aspect 28, the operations further include grouping log records together by key, wherein first log records associated with a first key are grouped into a first group and wherein second log records associated with a second key are grouped into a second group.

In an aspect 30 according to any one of aspects 28 to 29, the log records are grouped in memory.

In an aspect 31 according to any one of aspects 28 to 30, each log record includes one or more fields indicative of one or more attributes of processing a data item, wherein, for at least one log record, a field is a key field specifying a value of key associated with the data item.

In an aspect 32 according to any one of aspects 28 to 31, a subset of log records associated with a particular key do not include the key field.

In an aspect 33 according to any one of aspects 28 to 32, only one log record associated with a particular key includes the key field.

In an aspect 34 according to any one of aspects 28 to 33, the operations further include writing log records in a particular group associated with a particular key to a file at an end of pre-defined time interval.

In an aspect 35 according to any one of aspects 28 to 34, the operations further include reformatting the file; writing the reformatted file into an indexed compressed flat file (ICFF); and indexing the ICFF in an index by key.

In an aspect 36 according to any one of aspects 28 to 35, the specification includes a chart with a plurality of nodes, wherein each node represents one or more portions of the executable logic, wherein the chart is executable, wherein execution of the chart causes execution of portions of the executable logic, and the operations further include based on the log records, tracing traversal through one or more nodes of the chart in processing the one or more data items.

In an aspect 37 according to any one of aspects 28 to 36, the operations further include parsing the log records to identify which nodes of the chart are traversed and which nodes of the chart are not traversed.

In an aspect 38 according to any one of aspects 28 to 37, the log records specify which nodes of the chart are traversed and which nodes of the chart are not traversed.

In an aspect 39 according to any one of aspects 28 to 38, the operations further include receiving a user-initiated selection of one of the nodes; in response to receiving the selection, causing a configuration area to be displayed on a graphical user interface that provides a configuration means for the user to configure the one or more portions of the executable logic represented by selected node, wherein the configuration means includes means to turn on and off auditing; and receiving user-initiated turning on of the auditing via the configuration means causing the generating of the log record that is associated with the selected node.

In an aspect 40 according to any one of aspects 28 to 39, the generating of the log record specifying the execution of those one or more portions of the executable logic for that given value of the key includes: specifying in the generated log record an outcome of the execution of those one or more portions of the executable logic, specifying variables that are read or set upon the execution of those one or more portions of the executable logic, or identifying those one or more portions of the executable logic that are executed.

In an aspect 41 according to any one of aspects 28 to 40, the operations further include in response to executing the one or more portions of the executable logic, initiating an action to be executed by a computing system.

In an aspect 42 according to any one of aspects 28 to 41, the action includes requesting additional computational resources for the execution of the one or more portions of executable logic based on an execution characteristic of the execution of the one or more portions of executable logic.

In an aspect 43 according to any one of aspects 28 to 42, the operations further include maintaining the states by storing, in a data repository or in an in-memory data grid, state data indicative of which portion of the executable logic is currently being executed for each state.

In an aspect 44 according to any one of aspects 28 to 43, the operations further include in response to completing the processing of the one or more of the data items that are each associated with the given value of the key, updating the state data to specify a current state for that value of the key.

In an aspect 45 according to any one of aspects 28 to 44, the operations further include dynamically determining metrics indicative of which nodes of the chart are traversed and how many times the traversed nodes are traversed by the data items.

In an aspect 46 according to any one of aspects 28 to 45, the operations further include generating a stream of log records documenting paths taken through the chart; transforming the generated log records; and storing the transformed log records in a relational database or in an index compressed flat file including batching log records together at a specified granularity.

In an aspect 47 according to any one of aspects 28 to 46, the operations further include dynamically outputting the determined metrics via a user interface, wherein the outputted metrics are updated in response to a change to the determined metrics.

In an aspect 48 according to any one of aspects 28 to 47, the operations further include receiving a user selection of a first one of the data items of the stream; and causing display of an indication of the one or more portions of the executable logic currently being executed on the selected first one of the data items.

In an aspect 49 according to any one of aspects 28 to 48, the operations further include comparing the selected first one of the data items of the stream currently being processed with a predetermined reference data item; determining if a deviation exists between the first one of the data items of the stream currently being processed and the predetermined reference data item or if such a deviation does not exist; and outputting an indication whether the first one of the data items of the stream currently being processed is in agreement with the predetermined reference data item based on the determining if a deviation exists between the first one of the data items of the stream currently being processed and the predetermined reference data item or if such a deviation does not exist.

In an aspect 50 according to any one of aspects 28 to 49, the operations further include comparing the one or more portions of the executable logic currently being executed on the first one of the data items with a predetermined reference executable logic; determining if a deviation exists between the one or more portions of the executable logic currently being executed on the first one of the data items and the predetermined reference executable logic or if such a deviation does not exist; and outputting an indication whether the one or more portions of the executable logic currently being executed on the first one of the data items is in agreement with the predetermined reference executable logic based on the determining if a deviation exists between the one or more portions of the executable logic currently being executed on the first one of the data items and the predetermined reference executable logic or if such a deviation does not exist.

In an aspect 51 according to any one of aspects 28 to 50, a log record is a structured data record with a first field for storing data representing a state of the specification for a particular value of the key and a second field for storing data specifying which portions of the executable logic represented by the specification have been executed, from a time at which execution of the executable logic is started to at a current time, for that particular value of the key.

In an aspect 52 according to any one of aspects 28 to 51, a log record is a structured data record with a field for storing data specifying which portion of the executable logic represented by the specification has been executed at a current time for a particular value of the key.

In an aspect 53 according to any one of aspects 28 to 52, the specification is a chart, and wherein one or more log records specify a path through the chart that represents which portions of the executable logic are executed in processing one or more data records associated with a particular value of the key.

In an aspect 54 according to any one of aspects 28 to 53, the operations further include generating one or more output records based on processing of one or data items; wherein each of the one or more output records includes data not included in the log record.

In a general aspect 55, described are one or more machine-readable hardware storage devices for identifying one or more portions of executable logic that are executed in processing one or more data items that are each associated with a given value of a key, wherein a specification represents the executable logic, wherein the specification is associated with the key and wherein states of the specification are maintained for respective values of the key, the one or more machine-readable hardware storage devices storing instructions that are executable by one or more processing devices to perform operations including: accessing the specification that represents the executable logic, wherein a state of the specification for a particular value of the key specifies one or more portions of the executable logic that are executable in that state; intermittently receiving, over an input device or port, data items of a stream of data, with one or more of the data items each being associated with the given value of the key; and generating a log record for the given value of the key, with the log record specifying the one or more portions of the executable logic that are executed in processing the one or more of the data items that are each associated with the given value of the key, the generating including: for each of the one or more of the data items associated with the given value of the key: identifying a given state of the specification that is maintained for the given value of the key associated with that data item; processing, by the data processing system, that data item including executing, on that data item, one or more portions of executable logic that are specified in the identified given state of the specification; and generating the log record specifying the execution of those one or more portions of the executable logic for that given value of the key.

In an aspect 56 according to aspect 55, the operations further include grouping log records together by key, wherein first log records associated with a first key are grouped into a first group and wherein second log records associated with a second key are grouped into a second group.

In an aspect 57 according to any one of aspects 55 to 56, the log records are grouped in memory.

In an aspect 58 according to any one of aspects 55 to 57, each log record includes one or more fields indicative of one or more attributes of processing a data item, wherein, for at least one log record, a field is a key field specifying a value of key associated with the data item.

In an aspect 59 according to any one of aspects 55 to 58, a subset of log records associated with a particular key do not include the key field.

In an aspect 60 according to any one of aspects 55 to 59, only one log record associated with a particular key includes the key field.

In an aspect 61 according to any one of aspects 55 to 60, the operations further include writing log records in a particular group associated with a particular key to a file at an end of pre-defined time interval.

In an aspect 62 according to any one of aspects 55 to 61, the operations further include reformatting the file; writing the reformatted file into an indexed compressed flat file (ICFF); and indexing the ICFF in an index by key.

In an aspect 63 according to any one of aspects 55 to 62, the specification includes a chart with a plurality of nodes, wherein each node represents one or more portions of the executable logic, wherein the chart is executable, wherein execution of the chart causes execution of portions of the executable logic, and the operations further include based on the log records, tracing traversal through one or more nodes of the chart in processing the one or more data items.

In an aspect 64 according to any one of aspects 55 to 63, the operations further include parsing the log records to identify which nodes of the chart are traversed and which nodes of the chart are not traversed.

In an aspect 65 according to any one of aspects 55 to 64, the log records specify which nodes of the chart are traversed and which nodes of the chart are not traversed.

In an aspect 66 according to any one of aspects 55 to 65, the operations further include receiving a user-initiated selection of one of the nodes; in response to receiving the selection, causing a configuration area to be displayed on a graphical user interface that provides a configuration means for the user to configure the one or more portions of the executable logic represented by selected node, wherein the configuration means includes means to turn on and off auditing; and receiving user-initiated turning on of the auditing via the configuration means causing the generating of the log record that is associated with the selected node.

In an aspect 67 according to any one of aspects 55 to 66, the generating of the log record specifying the execution of those one or more portions of the executable logic for that given value of the key includes: specifying in the generated log record an outcome of the execution of those one or more portions of the executable logic, specifying variables that are read or set upon the execution of those one or more portions of the executable logic, or identifying those one or more portions of the executable logic that are executed.

In an aspect 68 according to any one of aspects 55 to 67, the operations further include in response to executing the one or more portions of the executable logic, initiating an action to be executed by a computing system.

In an aspect 69 according to any one of aspects 55 to 68, the action includes requesting additional computational resources for the execution of the one or more portions of executable logic based on an execution characteristic of the execution of the one or more portions of executable logic.

In an aspect 70 according to any one of aspects 55 to 69, the operations further include maintaining the states by storing, in a data repository or in an in-memory data grid, state data indicative of which portion of the executable logic is currently being executed for each state.

In an aspect 71 according to any one of aspects 55 to 70, the operations further include in response to completing the processing of the one or more of the data items that are each associated with the given value of the key, updating the state data to specify a current state for that value of the key.

In an aspect 72 according to any one of aspects 55 to 71, the operations further include dynamically determining metrics indicative of which nodes of the chart are traversed and how many times the traversed nodes are traversed by the data items.

In an aspect 73 according to any one of aspects 55 to 72, the operations further include generating a stream of log records documenting paths taken through the chart; transforming the generated log records; and storing the transformed log records in a relational database or in an index compressed flat file including batching log records together at a specified granularity.

In an aspect 74 according to any one of aspects 55 to 73, the operations further include dynamically outputting the determined metrics via a user interface, wherein the outputted metrics are updated in response to a change to the determined metrics.

In an aspect 75 according to any one of aspects 55 to 74, the operations further include receiving a user selection of a first one of the data items of the stream; and causing display of an indication of the one or more portions of the executable logic currently being executed on the selected first one of the data items.

In an aspect 76 according to any one of aspects 55 to 75, the operations further include comparing the selected first one of the data items of the stream currently being processed with a predetermined reference data item; determining if a deviation exists between the first one of the data items of the stream currently being processed and the predetermined reference data item or if such a deviation does not exist; and outputting an indication whether the first one of the data items of the stream currently being processed is in agreement with the predetermined reference data item based on the determining if a deviation exists between the first one of the data items of the stream currently being processed and the predetermined reference data item or if such a deviation does not exist.

In an aspect 77 according to any one of aspects 55 to 76, the operations further include comparing the one or more portions of the executable logic currently being executed on the first one of the data items with a predetermined reference executable logic; determining if a deviation exists between the one or more portions of the executable logic currently being executed on the first one of the data items and the predetermined reference executable logic or if such a deviation does not exist; and outputting an indication whether the or more portions of the executable logic currently being executed on the first one of the data items is in agreement with the predetermined reference executable logic based on the determining if a deviation exists between the one or more portions of the executable logic currently being executed on the first one of the data items and the predetermined reference executable logic or if such a deviation does not exist.

In an aspect 78 according to any one of aspects 55 to 77, a log record is a structured data record with a first field for storing data representing a state of the specification for a particular value of the key and a second field for storing data specifying which portions of the executable logic represented by the specification have been executed, from a time at which execution of the executable logic is started to at a current time, for that particular value of the key.

In an aspect 79 according to any one of aspects 55 to 78, a log record is a structured data record with a field for storing data specifying which portion of the executable logic represented by the specification has been executed at a current time for a particular value of the key.

In an aspect 80 according to any one of aspects 55 to 79, the specification is a chart, and wherein one or more log records specify a path through the chart that represents which portions of the executable logic are executed in processing one or more data records associated with a particular value of the key.

In an aspect 81 according to any one of aspects 55 to 80, the operations further include generating one or more output records based on processing of one or data items; wherein each of the one or more output records includes data not included in the log record.

The above aspects can include one or more of the following advantages.

The logging system described herein is able to process log records with a minimal impact on system resources (such as memory and processing power). Additionally, the system described herein processes these log records with reduced latency. Metrics of the execution of executable logic are dynamically determined and outputted such that the user can track these metrics in real time. Furthermore, the user is enabled to control for which executable logic log records are to be generated to focus the logging on the parts of interest while reducing the generation of excess data amounts. This assists the user in understanding, tracking and properly operating the underlying data processing system.

Other features and advantages of the invention will become apparent from the following description, and from the claims.

DESCRIPTION

Figure 1:
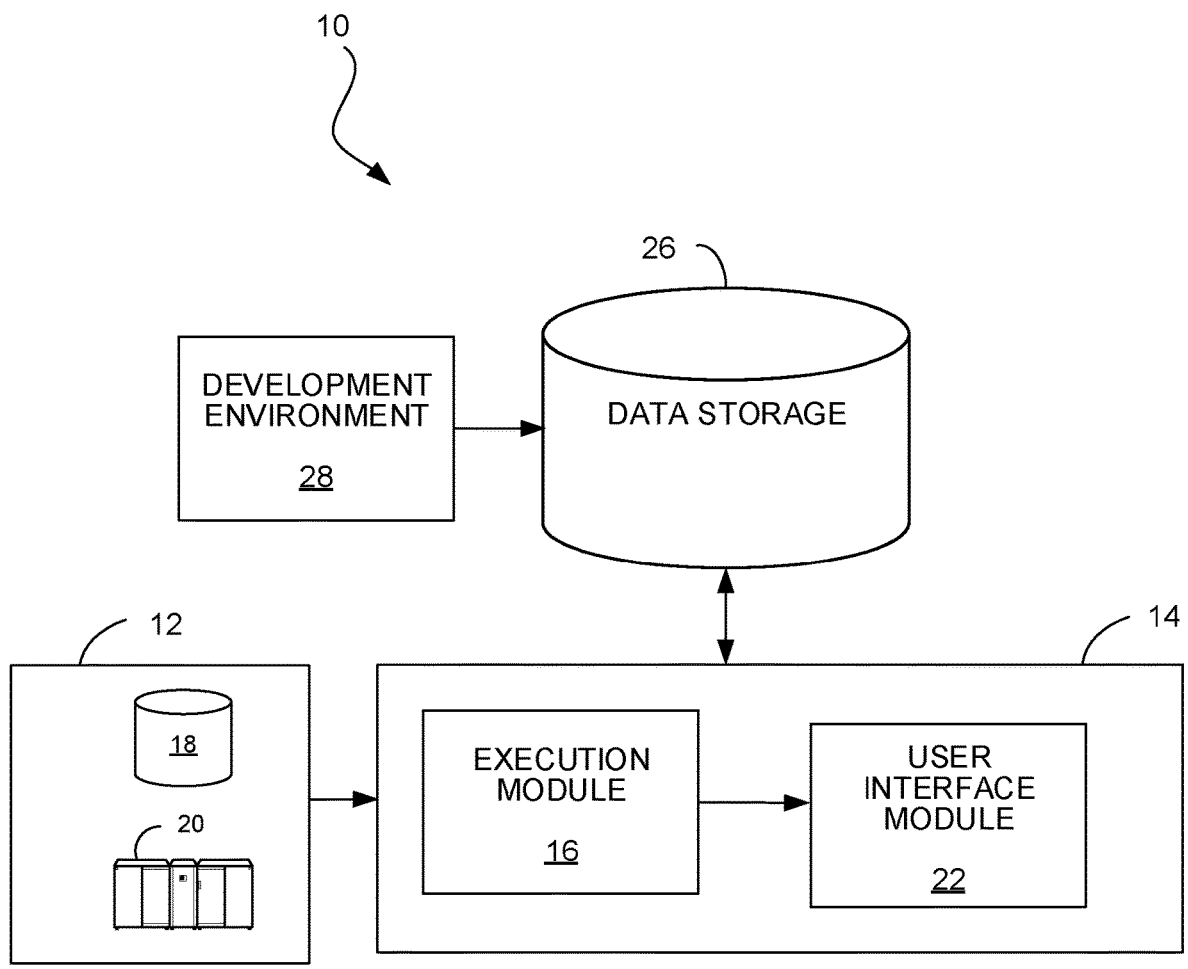
FIG. 1 is a schematic diagram of a database management system.

Referring to FIG. 1, a system 10 for logging includes a data source 12 that may include one or more sources of data such as storage devices or connections to online data streams, each of which may store data in any of a variety of storage formats (e.g., database tables, spreadsheet files, flat text files, or a native format used by a mainframe). An execution environment 14 (e.g., a data processing system) includes an execution module 16 and a user interface module 22. The execution environment 14 may be hosted on one or more computers under the control of a suitable operating system, such as the UNIX operating system. For example, the execution environment 14 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

The execution module 16 implements logging (e.g., chart logging) that provides details about a state of and a path taken by data through a computer program (e.g., a chart such as a dataflow graph as described in U.S. Patent No. U.S. Pat. No. 5,966,072, titled "Executing Computations Expressed as Graphs," the entire contents of which are incorporated herein by reference) for each unique key (e.g., identifier (ID)) for which data records (herein also called "data item") are processed by the computer program. In some examples, execution module 16 implements data logging in graph-based computations, as described in U.S. Pat. Pub. 2009/0327196, the entire contents of which are incorporated herein by reference. In this application, the term "dataflow graph" or "chart" are used as example of or other word for "computer program". In some examples, the terms "dataflow graph" and "chart" are used herein interchangeably and without distinction, for purposes of convenience. In some examples, the unique key represents a customer ID for each customer for which records are processed by the chart. The user interface module 22 displays logging information (e.g., metrics indicative of which portions of a chart are traversed and aggregate metrics indicative of how many times certain portions of a chart are traversed by a group of records). Metrics described throughout this specification may dynamically, i.e. during the executing of the executable logic, be determined. In this example, the charts (e.g., the dataflow graphs) can be stored in data storage 26. Storage devices providing the data source 12 may be local to the execution environment 14, for example, being stored on a storage medium connected to a computer running the execution environment 14 (e.g., hard drive 18), or may be remote to the execution environment 14, for example, being hosted on a remote system (e.g., mainframe 20) in communication with a computer running the execution environment 14 over a local or wide area data network.

The execution environment 14 is in communication with data storage 26, which stores data used by the user interface module 22 to display one or more user interfaces. Data storage 26 is also accessible to a development environment 28 (e.g., which may be optional) for developing user interfaces and charts (with logging functionality), stored in data storage 26, that are accessed by execution module 16 (in executing charts) and that are used by the user interface module 22 to display the user interfaces.

In some examples, a chart or dataflow graph is a computer program executed within a dataflow graph execution environment that processes data from one or more data sources. The data from the data sources are manipulated and processed according to the computer program and exported to one or more data sinks. Data sources and sinks can include files, databases, data streams, or queues, for example. Dataflow graphs are represented as directed graphs including nodes representing data processing components each including program code (e.g., executable logic) for processing data from at least one data input and providing data to at least one data output, and nodes representing dataset objects for accessing the data sources and/or sinks. The nodes are connected by directed links representing flows of data between the components, originating at the data sources and terminating at the data sinks. The data output ports of upstream components are connected to the data input ports of downstream components. The dataflow graphs may be reused for different data sources and different data sinks represented by the dataset objects. The data structures and program code used to implement dataflow graphs can support multiple different configurations by being parameterized, for example, to enable different sources and sinks to be substituted readily, for example. Furthermore, in some arrangements, the flow of data in the dataflow graph may be altered by the use of parameters, such that one of the components or a series of the components may be bypassed. In general, a parameter represents a property of a component of the dataflow graph that can be configured with a value and whose value can changed. For example, such property can be changed between uses of the dataflow graph, and the dataflow graph may perform operations differently as a result of the change.

The construction of a dataflow graph can be highly technical in nature in some cases. While written to achieve specific business ends, the underlying structure and construction of the graph is determined based upon technical considerations. For example, graph components may be selected to maximize reusability, or to support parallel processing. On the other hand, how and where a graph is used may be largely a business decision. Some of the parameters associated with such a parameterized dataflow graph can be used to enable business users to customize dataflow graphs without requiring the user to understand the technical complexities behind its implementation. The parameterized dataflow graphs simplify customization and facilitate reuse.

In other words, the computer system 10 illustrated in FIG. 1 may include: an optional development environment 28 coupled to a data storage 26, wherein the development environment 28 is configured to build a computer program that is associated with a chart or data flow graph that implements a computation performed on data flowing from one or more input data sets through a chart or graph of data processing components to one or more output data sets, wherein the chart or data flow graph is specified by data structures in the data storage 26, the chart or dataflow graph having a plurality of nodes being specified by the data structures and representing the data processing components connected by one or more links, the links being specified by the data structures and representing data flows between the data processing components; an execution environment 14 coupled to the data storage 26 and being hosted on one or more computers, the execution environment 14 including an execution module 16 configured to read the stored data structures specifying the chart or data flow graph and to allocate and configure computing resources for performing the computations of the data processing components that are assigned to the chart or data flow graph by the execution module 16, wherein the execution module 16 is configured to schedule and control execution of the assigned computations of the data processing components such that any one of the methods or processes described herein is executed.

As described in further detail below, FIGS. 2A-2D show a progression through a flowchart and illustrate that various nodes are executed in various states of the flowchart. FIGS. 2E-2G illustrate various audit records that are generated in the various states.

Figure 2A:
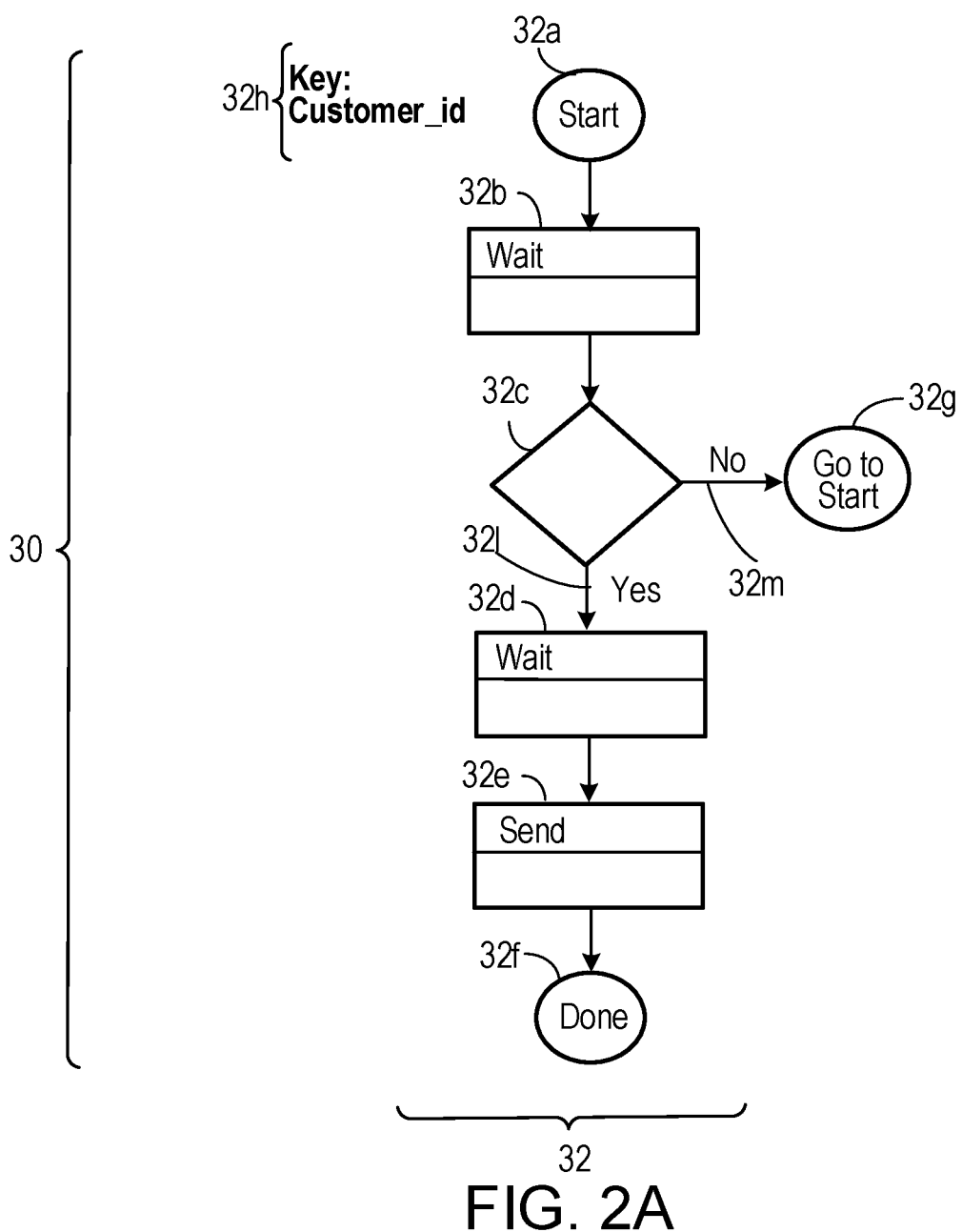
FIGS. 2A-2G and 5 are each a diagram of a flowchart.

Referring to FIG. 2A, diagram 29a shows specification 30 includes that flowchart 32 with nodes 32a-32g representing data processing components. Generally, a specification represents executable logic and specifies various states, wherein a state of the specification specifies one or more portions of the executable logic that are executable in that state, based on a state reached from executing the executable logic on prior data items. Generally, executable logic includes source code and other computer instructions. In this example, one or more of the data processing components refers to a particular grouping or portion of executable logic. Generally, a chart includes a template for processing data records. This template includes a graphic unit of logic for reacting to input data records and producing output data records, e.g., a data record generated based on logic included in a specification. A chart is an example of a specification. Generally, a graphic unit of logic includes logic that is at least partly generated graphically, e.g., by dragging and dropping various nodes from a template (not shown) to a window for building a chart. In an example, a node includes logic (not shown) that specifies how input data records are processed, how to set values for variables used by the executable logic, which output data records to generate, e.g., upon satisfaction of conditions specified by the logic, and so forth. In an example, a node is programmable by a user inputting values of parameters and/or of variables used in the logic of a node.

The chart itself is executable, as the logic in the nodes is compiled into executable logic and as each node corresponds to one or more portions of that executable logic. For example, the system transforms the specification (and/or a chart in the specification) by compiling the logic in the nodes into executable logic. Because the chart itself is executable, the chart itself is capable of processing data records and of being stopped, started and halted. The system also maintains state for flowchart 32, e.g., by tracking which one of nodes 32a-32g is currently being executed. A state of flowchart 32 corresponds to a state of executable logic represented by flowchart 32. For example, each node in flowchart 32 represents a particular state of the executable logic (in which one or more portions of the executable logic are executable in that state). When flowchart 32 is being executed for numerous values of a key, the system maintains a state of flowchart 32 for each value of the key, e.g., by maintaining state for each instance—as described in further detail below. Generally, an instance of the specification includes a specific realization of the specification for a unique value of a key, e.g., by executing executable logic represented in the specification and maintaining state of the executable logic for each unique value of the key. In this example, flowchart 32 includes a state transition diagram in which each incoming data record drives transitions between nodes and data records are evaluated based on a state reached from processing prior data records. The links between nodes in flowchart 32 represent the temporal flow of the logic.

Specification 30 also includes key 32h that identifies that flowchart 32 processes data records that include key 32h or are associated with key 32h. In this example, a custom identifier (ID) is used as the key. The key 32h can correspond to one of the fields of a data record, e.g., such as a subscriber_ID field, a customer_ID field, a session_ID field and so forth. In this example, the customer_D field is a key field. For a particular data record, the system determines a value of a key for that data record by identifying the value of the key field for that data record.

In this example, flowchart 32 subscribes to data records that are of a specified type (e.g., specified when flowchart 32 is configured). In this example, flowchart 32 subscribes to data records that include key 32h. In this example, flowchart 32 and the data records share a key. Generally, a flowchart subscribes to types of data records by including logic to process those data records that include the key of the flowchart. When data record processing begins, the system starts new flowchart instances for each new value of the key for that flowchart, e.g., by maintaining state of the executable logic (represented in the flowchart) for each new value of the key. Generally, a flowchart instance includes a specific realization of the flowchart for a unique value of a key, e.g., by executing executable logic represented in the specification and maintaining state of the executable logic for each unique value of the key. The system performs data record processing by configuring the flowchart instances (and thus the underlying executable logic) to respond to data records for a particular key value. In an example, a flowchart subscribes to customer short message service (SMS) data records. The flowchart instance for a particular customer ID manages data records for that customer. There can be as many flowchart instances as there are customer IDs encountered in the incoming data records.

Figure 2B:
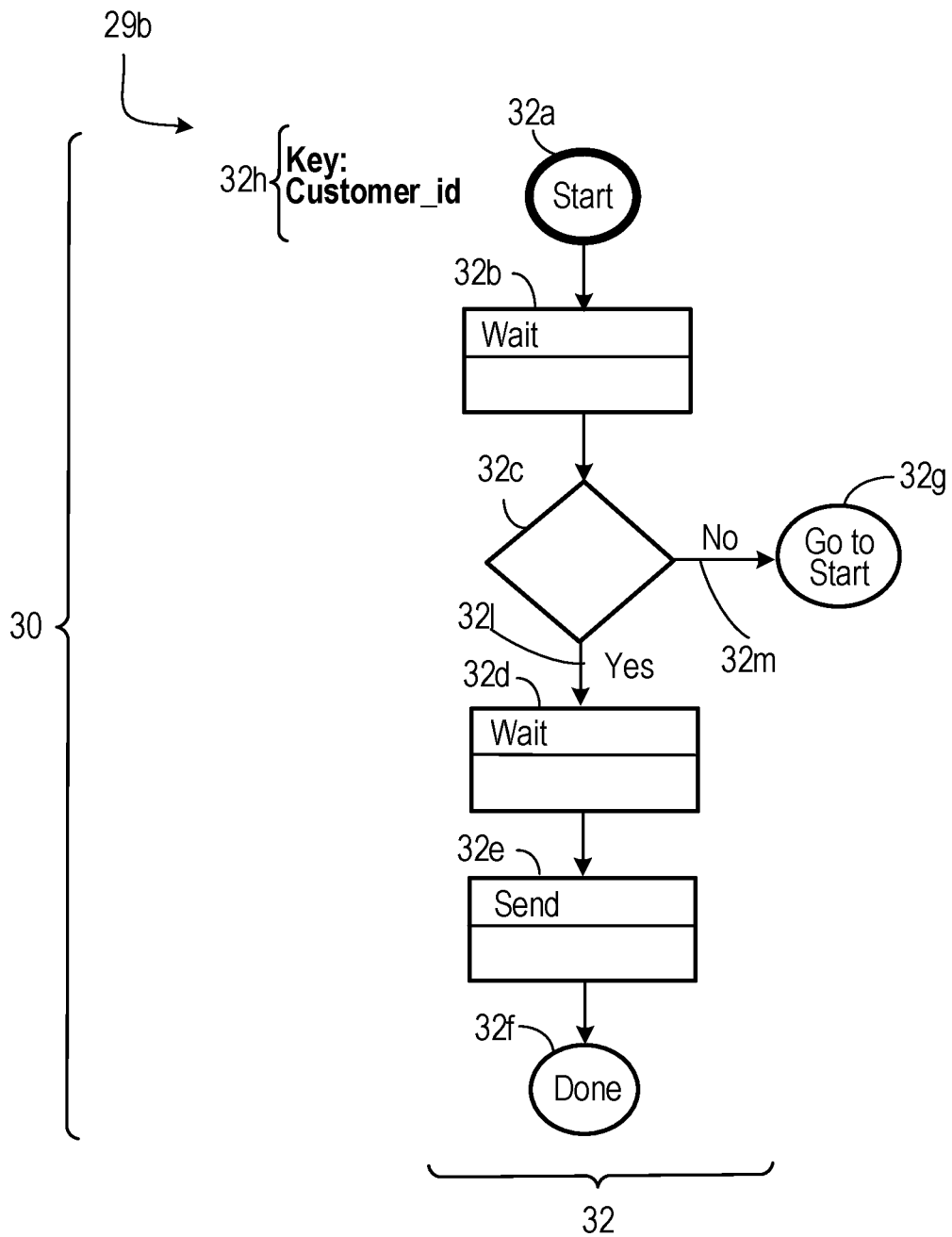
Figure 2C:
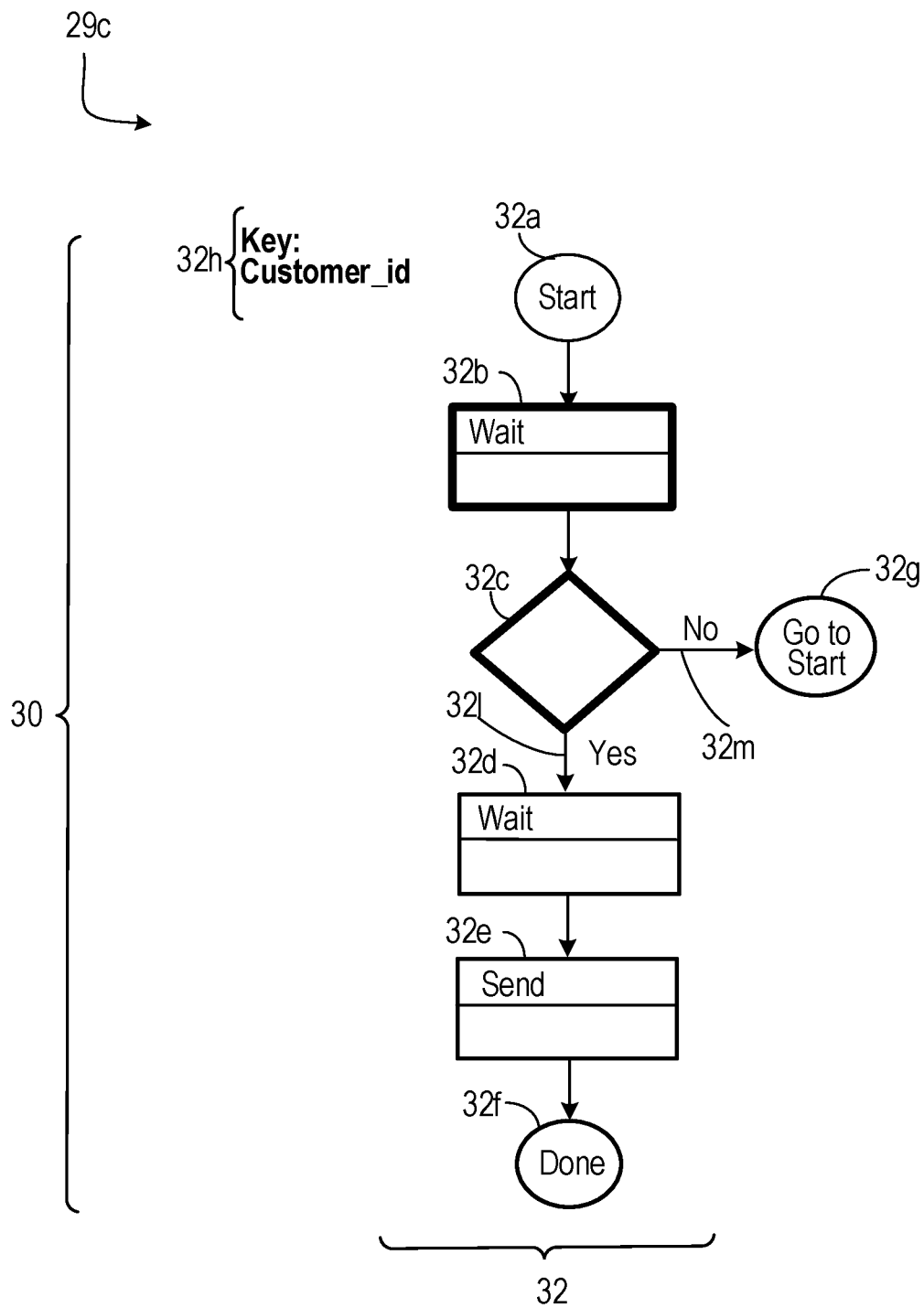

Referring to FIG. 2B, diagram 29b illustrates a start of execution of flowchart 32. In this example, node 32a represents a start of the executable logic and is being currently executed (e.g., as indicated by the dark like around node 32a). In this example, flowchart 32 is in a state in which node 32a is being executed. Referring to FIG. 2C, diagram 29c illustrates a state of flowchart 32 following completion of node 32a. In this example, the state of flowchart 32 transitions to node 32b, which represents one or more other portions of the executable logic. Node 32b includes a wait node (hereinafter wait node 32b). Wait node 32b represents a wait state in which a portion of executable logic (corresponding to wait node 32b) waits for an input data record satisfying one or more conditions. In an example, a wait state may be part of another state of flowchart 32, e.g., a state in which the system executes a wait node (to implement a wait state) and then executes one or more other nodes. Following completion of the portion of executable logic represented by wait node 32b, the system exits the wait state and executes node 32c, which represents executable logic for implementing a decision. In this example, node 32c includes a decision node. Hereinafter, node 32c is referred to as decision node 32c. Generally, a decision node includes a node that includes logic for execution of a decision (e.g., logic that evaluates to a Boolean value).

Figure 2D:
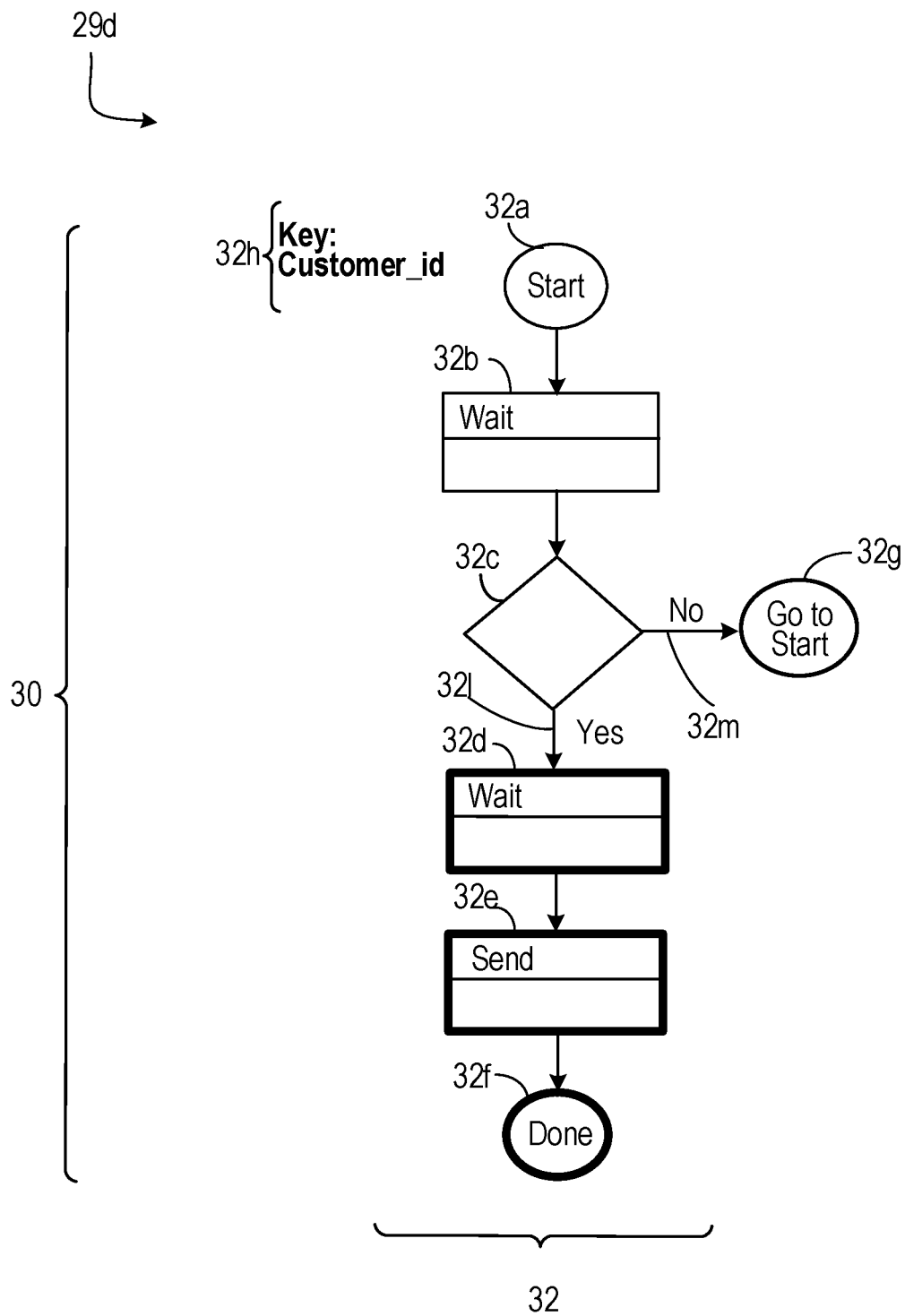
Figure 2E:
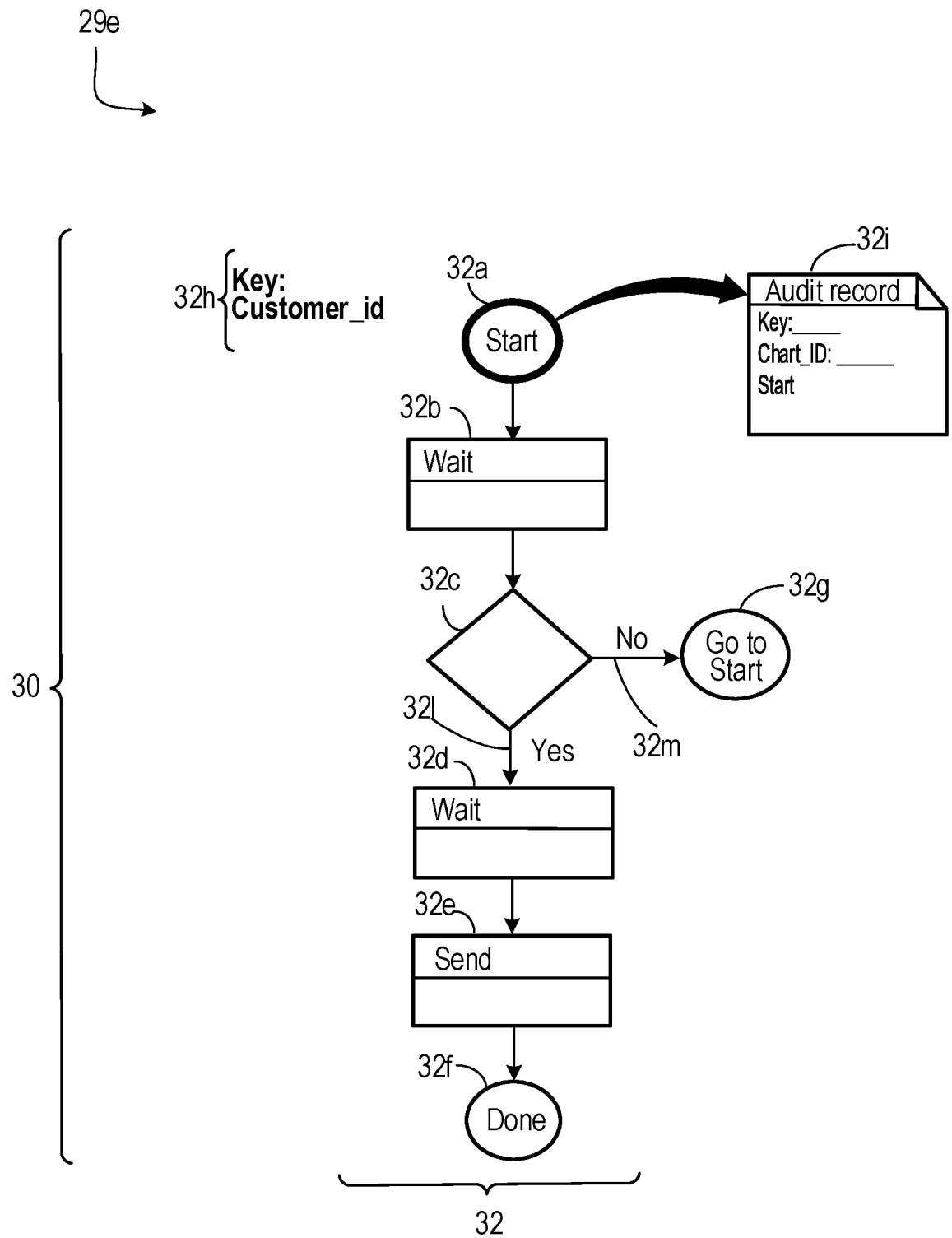
Figure 2F:
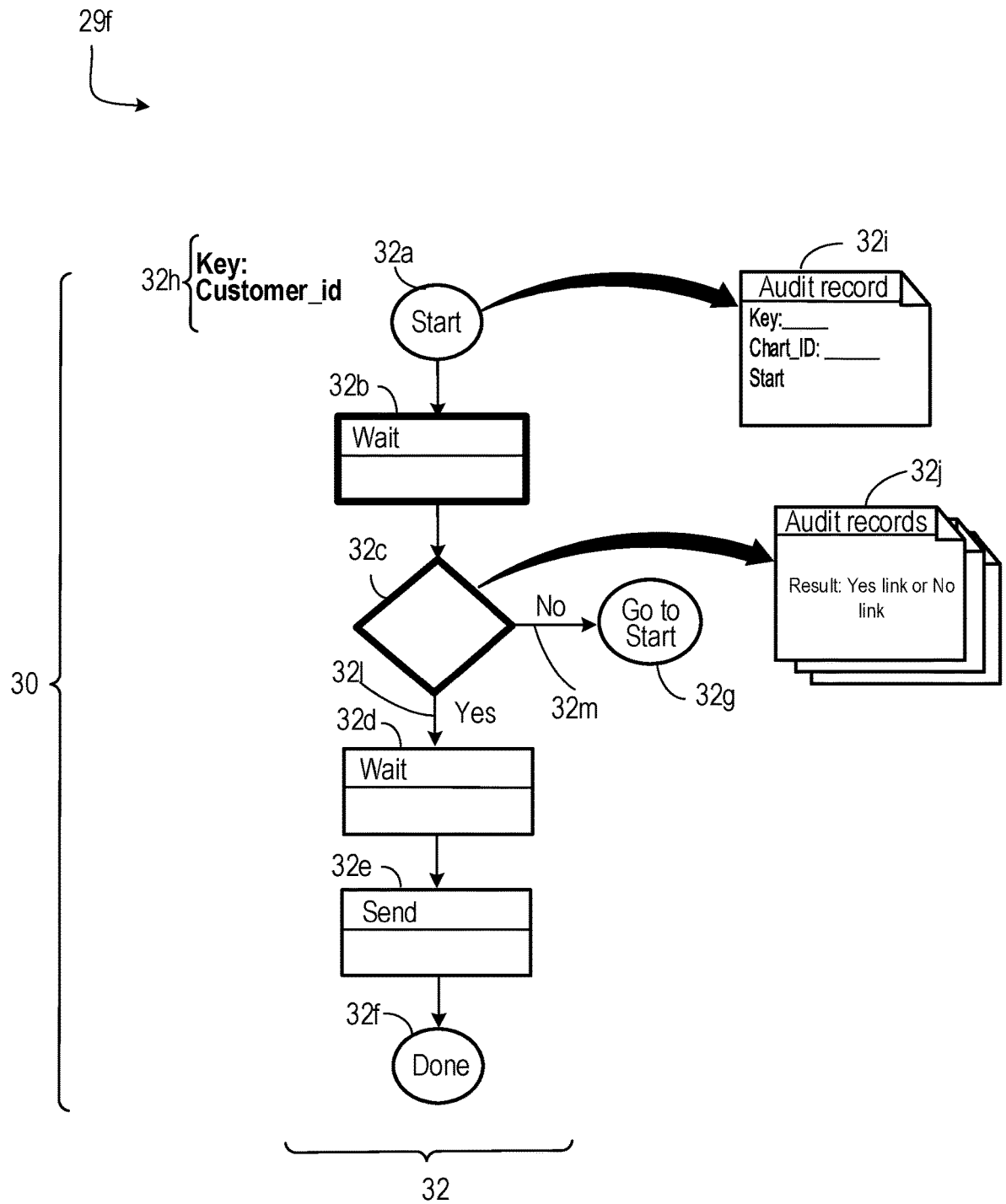
Figure 2G:
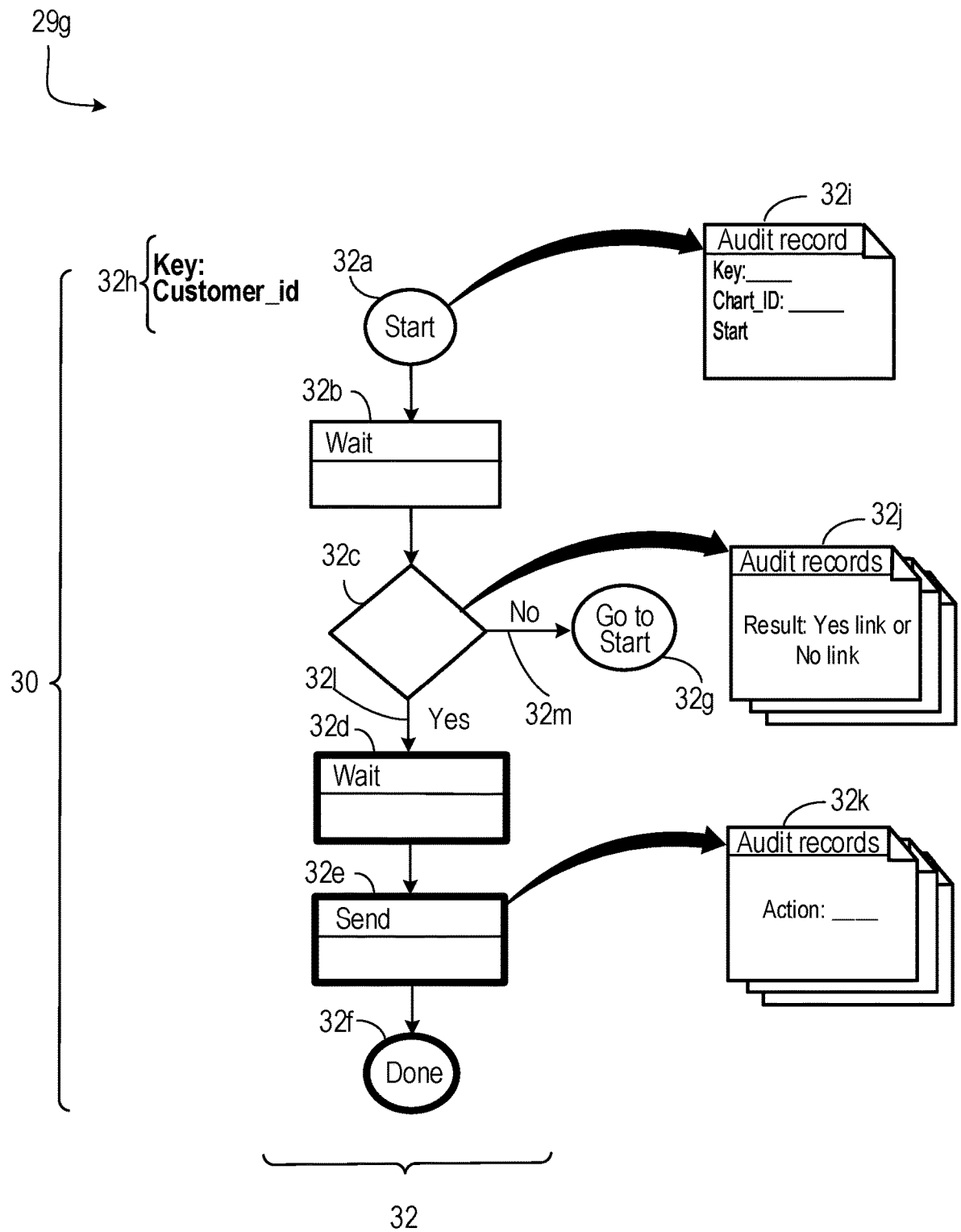

Referring to FIG. 2D, diagram 29d illustrates a state of flowchart 32 that is based on an outcome of the decision represented by node 32c. In particular, based on an outcome of the decision represented by node 32c, the state of flowchart 32 transitions to node 32d, which is another wait node. (In a variation, the state of flowchart 32 may transition to node 32g (which causes state to transition back to node 32a)). Following completion of the portion of executable logic represented by wait node 32d, the state of flowchart 32 transitions to node 32e, which includes a send node. Generally, a send node includes a node that represents executable logic for causing data transmission to another system. Following completion of execution of the portion of executable logic represented by node 32e, the state of flowchart 32 transitions to node 32f, which includes a done node. Generally, a done node represents that execution of the executable logic is complete.

In this example, flowchart 32 includes two states, a first state represented by nodes 32b, 32c, 32g and a second state represented by nodes 32d, 32e, 32f In this first state, the system waits for particular data records (as represented by node 32b) and then executes node 32c, which in turn causes a transition (of specification 30 and/or of chart 32) to the second state (the start of which is represented by node 32d) or causes execution of node 32g. Once in the second state, the system again waits for particular data records (as represented by node 32d) and then executes node 32e and node 32f By including nodes other than wait nodes, flowchart 32 includes a logic graph of temporal processing of data records.

Referring to FIG. 2E, diagram 29e illustrates a starting state of flowchart 32 in which an audit record is generated upon execution of start node 32a. In particular, start node 32a represents a data processing component that is configured to generate audit record 32i, e.g., when flowchart 32 is in a state in which start node 32a is being executed—as shown in this example. Generally, an audit record (or also called "log record") includes a data item (e.g., a structured item of data) that specifies a node that is traversed (and/or a data processing component that is executed) in processing a data record or an event and one or more attributes of processing the data record or event. In some examples, a log record is a structured data record with a first field for storing data representing a state of the specification for a particular value of the key and a second field for storing data specifying which portions of the executable logic represented by the specification have been executed, from a time at which execution of the executable logic is started to at a current time, for that particular value of the key. In this example, upon processing of data records for a particular key, the system generates an audit record (or one or more audit records) and stores, in a first field, data representing a state of the specification for the particular value of the key and stores, in a second field, data specifying which portions of the executable logic represented by the specification have been executed, from a time at which execution of the executable logic is started to at a current time, for that particular value of the key. In still other examples, a log record is a structured data record with a field for storing data specifying which portion of the executable logic represented by the specification has been executed at a current time for a particular value of the key. In this example, upon generating the audit record, the system populates a field of the audit record with data specifying which portion of the executable logic represented by the specification has been executed at a current time for a particular value of the key. In still other examples, the specification is a chart and one or more log records specify a path through the chart that represents which portions of the executable logic are executed in processing one or more data records associated with a particular value of the key. In this example, the system generates log records that specify a path through the chart that represents which portions of the executable logic are executed in processing one or more data records associated with a particular value of the key. In yet other examples, the system generates one or more output records based on processing of one or data items. In this example, each of the one or more output records includes data not included in the log record.

As described in further detail below, various types of audit records are predefined with various fields, each field type specifying one or more attributes of processing the data record or event. Generally, an event includes a data record (e.g., in a predefined format) that represents a particular occurrence or an absence thereof. In this example, node 32a is editable, e.g., by clicking on node 32a, which causes a configuration screen to be displayed that can be used in configuring a node and thereby also the data processing component represented by the node. Part of the configuration may include turning on auditing (or also called "logging") and specifying one or more types of audit records that are to be generated upon traversal of that node. In another example, the system described herein generates data for a user interface that displays visual representations of the various types of audit records and provides controls for turning on/off the various types of audit records. In this example, the system then generates an audit record of a type (e.g., when logging for that type of audit record is enabled) that corresponds to or is associated with a particular type of node or data processing component. For example, audit record 32i is a chart start audit record for logging data specifying the start of a chart. As such, if a user specifies that a chart start audit record is enabled, then the system described herein identifies a correspondence between the chart start audit record and a start node (e.g., node 32a), based on the fact that a start node starts a chart and a chart start audit record logs the start of a chart, and will generate a chart start audit record. In this example, audit record 32i includes a key field (for specifying a key for which the chart is instantiated or executed), a chart_ID for specifying an identifier that uniquely identifies chart 32 and a value of "start" to specify that the chart has started.

Referring to FIG. 2F, diagram 29f illustrates a second state of flowchart 32, in which audit records 32j are generated. In particular, a data processing component represented by decision node 32c is configured to generate audit records 32j, e.g., when flowchart 32 is in a state in which decision node 32c is being executed—as shown in this example. (In this example, wait node 32b is also being executed in this state. However, wait node 32b is not configured to generate audit records.). In this example, one of audit records 32j specifies an outcome of decision node 32c, e.g., by specifying whether yes link 32 or no link 32m is traversed. Others of audit records 32j may specify variables that are read or set, e.g., upon execution of the data processing component represented by decision node 32c. In this example, audit records 32j do not need to include a key field, because the audit records are transmitted to a processing system (e.g., an internal or external computing system that processes the audit records) at specified pulses (e.g., times or pre-defined time intervals), resulting in the audit records being transmitted in a group, a block or as part of a file.

For example, the system groups audit records together by key, wherein first audit records associated with a first key are grouped into a first group and wherein second audit records associated with a second key are grouped into a second group. In this example, the audit records are grouped in memory of the system (e.g., system 10). The system groups the audit records in memory for space efficiency, so that the system does not have to replicate data across sequentially related audit records, e.g., by including the key in each audit record. Each audit record includes one or more fields indicative of one or more attributes of processing a data item. For at least one audit record, a field is a key field specifying a value of key associated with the data item. Because the audit records are grouped together by key, a subset of audit records associated with a particular key do not include the key field. In some examples, only one audit record included in a group for a particular key includes the key field. In this example, the system writes audit records in a particular group associated with a particular key to a file at an end of pre-defined time interval (e.g., pulse).

For example, the system identifies a key for the audit records in the group (which may be represented as a block or file) by parsing contents of a first audit record or a chart start audit record. Because not every audit record needs to include a key field (and other fields, such as a chart_ID field, which may also be looked-up in the chart start audit record by other audit records included in a same pulse as audit record 32i), the system described herein is able to process audit records with a minimal impact on system resources (such as memory and processing power), relative to an impact on system resources if each audit record needs to include a key field to enable keyed logging of events. Additionally, the system described herein processes these audit records with reduced latency, because the size of the audit records is reduced due to each audit record not needing to include a key field, relative to a latency of processing audit records in which each audit record has a key field. Additionally, the system is configured to store the audit records in partitions (in memory) that are assigned to a particular key, further reducing the need for each audit record to include a key field. At the start of a new pulse, the system described herein is configured to include a key field in that first audit record for that pulse.

Referring to FIG. 2G, diagram 29g illustrates a third state of flowchart 32 in which audit records 32k are generated. In particular, send node 32e is also configured to generate audit records 32k. In this example, at least one of audit records 32k specifies an action that was implemented by the data processing component represented by send node 32e. As with audit records 32*j*, audit records 32*k* also do not need to include a key field, as audit records 32*k* are transmitted as part of a same pulse that includes audit record 32*i*. Others of audit records 32*k* may specify a time at which an action was sent, values of variables read, values of variable set and so forth.

In this example, the system parses contents of the audit records to trace traversal through one or more nodes of chart 32 in processing one or more data items. Additionally, the system parses the audit records to identify which nodes of chart 32 are traversed and which nodes of chart 32 are not traversed and why they are not traversed (e.g., which links or paths were not traversed for those nodes).

Figure 3:
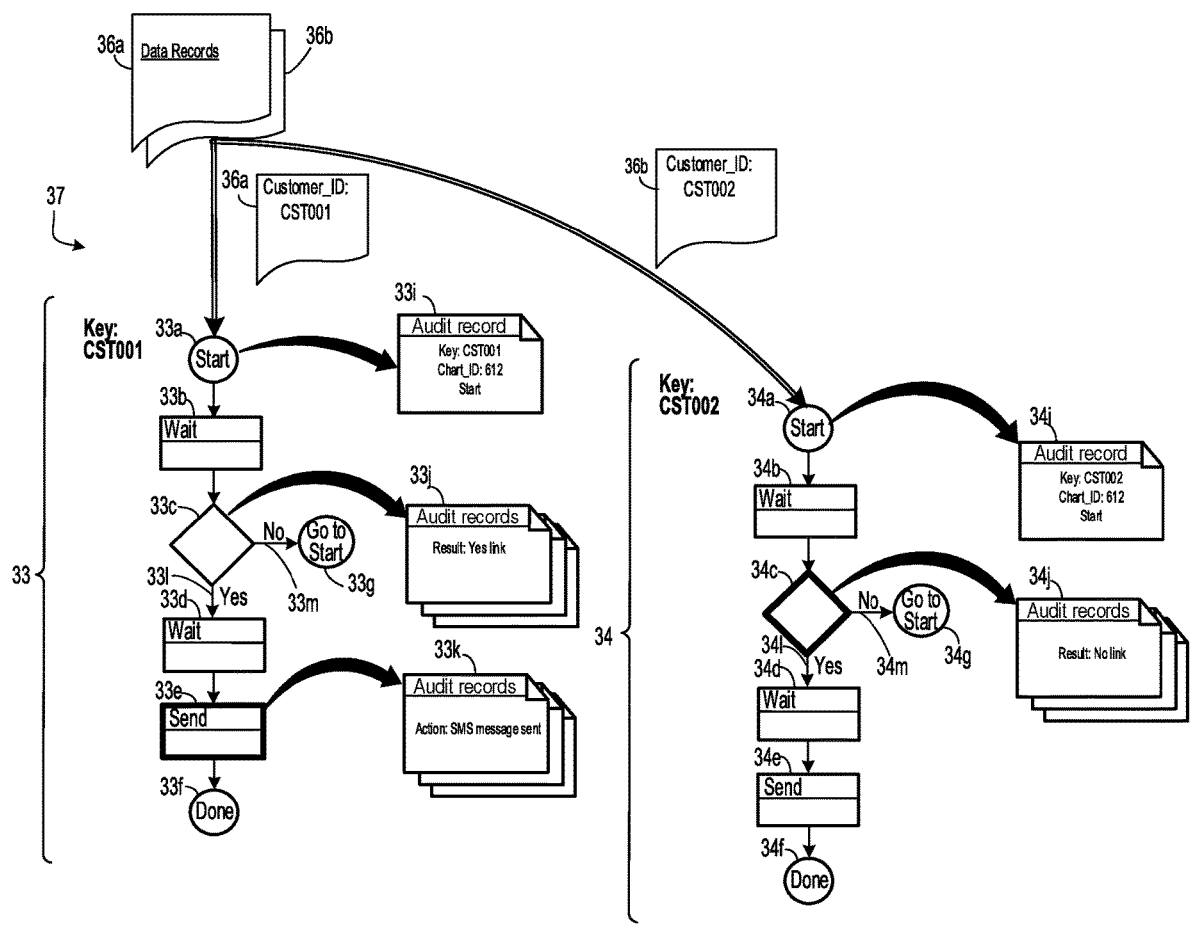
FIG. 3 is a diagram of flowchart instances.

Referring to FIG. 3, diagram 37 illustrates flowchart instances 33, 34, e.g., which are generated by the system from flowchart 32 (FIG. 2A), and data items of data records 36*a*, 36*b*. That is, a new copy or instance of flowchart 32 is created for each new key detected in data records 36*a*, 36*b*.

Each of flowchart instances 33, 34 is associated with a "customer_id" key. Flowchart instance 33 processes data records that include a value of "VBN3419" in its "customer_id" field, which in this example is the key field. Flowchart instance 34 processes data records that include a value of "CND8954" in its "customer_id" field. In this example, a system does not re-execute the executable logic for each flowchart instance. Rather, the system executes the executable logic and then implements the flowchart instances by maintaining state for respective values of the keys. Accordingly, an example of "a flowchart instance processing data records" is the system executing the executable logic (that is represented by a flowchart), maintaining state for each value of a key and processing data records associated with a particular value of the key (based on a state of the state machine for that particular value of the key).

In this example, flowchart instance 33 includes nodes 33*a* -33*g*, which correspond to nodes 32*a*-32*g* in FIG. 2A, respectively, and links 33*l*, 33*m*. Flowchart instance 34 includes nodes 34*a* -34*g*, which correspond to nodes 32*a*-32*g* in FIG. 2A, respectively, and links 34*l*, 34*m*.

Flowchart instances are themselves executable. After the system receives an input data record associated with a particular value of a key, a flowchart instance for that particular value of the key processes the input data record, e.g., by a system executing, on the data record, one or more portions of executable logic corresponding to a flowchart instance (or to one or more nodes of the flowchart instance). The flowchart instance continues processing the input data record, until the input data record reaches a done node or a wait node. In this example, the flowchart instance continues processing the input data record, e.g., by the system continuing to process the input data record until a portion of the executable logic corresponding to a done node or a wait node is reached. If an input data record reaches a wait node, the flowchart instance pauses until a certain amount of time passes or an appropriate new input data record arrives. Generally, an appropriate data record includes a data record that satisfies one or more specified conditions or criteria (e.g., included in the logic of a node). If an input data record reaches a done node, execution of the flowchart instance is complete.

A flowchart instance has its own lifecycle. As data records arrive, a current state or status of the flowchart instance changes: data records trigger decisions, or a return to a start of the flowchart instance, or a message sent to a customer. The flowchart instance for the customer ends when a data record reaches a done node.

In this example, the system starts flowchart instance 33 for a "VBN3419" value of the key field (e.g., customer_id =VBN3419). Flowchart instance 33 processes a subset of data records 36*a*, 36*b* that include a customer_id of VBN3419. In this example, flowchart instance 33 processes data record 36*a*, with a value of "VBN3419" in the customer_id key field. Nodes 33*a*, 33*b*, 33*c*, 33*d* of flowchart instance 33 process data record 36*a*. In this example, upon execution of the processing component represented by node 33*a*, the system generates audit record 33*i*, which specifies that chart 32 (which is assigned chart_ID: 3454) and been started for key: VBN3419. Upon execution of the data processing component corresponding to node 33*c*, the sytem generates audit records 33*j*, at least one of which specifies that link 33*l* of instance 33 is traversed. A current state of flowchart instance 33 is that of sending or executing an action, as represented by the dashed line of node 33*e*. In this example, the data processing component represented by node 33*e* generates audit records 33*k*, at least one of which specifies that action. The action may include sending an SMS message (e.g., that includes an offer or promotion) is sent. Other such "actions" described herein may be one or more of initiating execution of another computer program to further process the processed data records, initiating storing of the processed data records in memory, initiating transmission of the processed data records to another computer system via a network connection, or requesting additional computational resources for one or more of the data processing components represented by nodes in one or more of the flowcharts 32, 33, 34. For example, the outcome of the flowchart instance 33 may be the execution of the action of requesting additional computational resources for one of the data processing components represented by the nodes (such as one of nodes 32*b*, 32*c*, 32*d*, 32*e*, 32*f*, 33*b*, 33*c*, 33*d*, 33*e*) in flowchart instance 33 based on one or more execution characteristics of the flowchart instance 33. An example for such an execution characteristic may be a waiting time of one or more of the wait nodes 32*b*, 32*d*, 33*a*, or 33*d*. The request for additional computational resources may be granted, leading to receiving an allocation of the requested additional computational resources. The term "computational resources" used herein includes one or more of access to a portion of memory (such as primary memory) accessible by the execution environment 14, access to data storage (such as data source 12 or data storage 26) accessible by the execution environment 14, and access to a required amount of processing power of the execution environment 14 (such as access to CPU or virtual cores accessible by the execution environment 14).

In this example, the system maintains state for instance 33, which is executed for a particular key value (i.e., VBN34199). As such, the system is able to log which nodes of instance 33 are traversed for that particular key value—in processing events or data records that are associated with that key value. Additionally, by grouping the audit records together in a pulse, audit records 33*j*, 33*k* do need to include a key field and can still be identified as being audit records for the key specified in audit record 33*i*, when audit records 33*i*, 33*j*, 33*k* are included in a same pulse.

The system starts flowchart instance 34 for a "CND8954" value of the key (e.g., customer_id=CND8954). Flowchart instance 34 processes a subset of data records 36*a*, 36*b*, that include a customer_id of CND8954. In this example, flowchart instance 34 includes wait nodes 34*b* and 34*d*. Each data record can only satisfy the condition of one wait node per flowchart instance. Accordingly, flowchart instance 34 processes data record 36*b* with a customer_id=CND8954 through nodes 34a, 34b to node 34d and then waits for a second data record with the same key before proceeding to node 34e, e.g., when the output of decision node 34c is "yes." Upon processing of data record 36b with node 34a, the system described herein generates audit record 34i that specifies that chart 32 (identified by Chart_ID: 3454) is started for key: CND8954. However, in this example, the output of decision node 34c is "no," as represented by the dotted line around node 34g. As such, the data processing component represented by node 34c generates audit records 34j, one of which specifies that link 34m is traversed based on outcome of a decision represented by decision node 34c. In this example, send node 34e is not traversed. As such, the data processing component represented by send node 34e does not generate audit records. In the forgoing examples, reference to a node processing a data record refers to a data processing component that represents the node processing the data record. Additionally, in these examples, the charts themselves are executable—execution of which causes execution of the executable logic corresponding to the nodes of the chart or execution of data processing components encapsulating portions of execution logic.

In a variation of FIG. 3, the system generates more than one flowchart instance for a single key value. For example, there can be a number of flowchart instances for the same customer that have different start and end dates, or a number of flowchart instances for the same customer for different purposes, such as different industrial processes or different marketing campaigns.

In this example, the system maintains states for the instances by storing, in a data repository or in an in-memory data grid, state data, e.g., data indicative of which node is currently being executed for each instance. Generally, state data includes data indicative of a state. In this example, an instance is associated with value of the key. The data repository or the in-memory data grid stores the values of the key. The system maintains state for the instances by storing state data for each value of the key. Upon completion of processing a data record for a particular value of the key, the system updates the state data, in the data repository, to specify that the next node (in flowchart 32 in FIG. 2A) represents a current state for that value of the key. Then, when another data record arrives, the system looks-up, in the data repository, the current state for that value of the key and executes portions of executable logic corresponding to a node that represents the current state of the executable logic for that value of the key.

Figure 4:
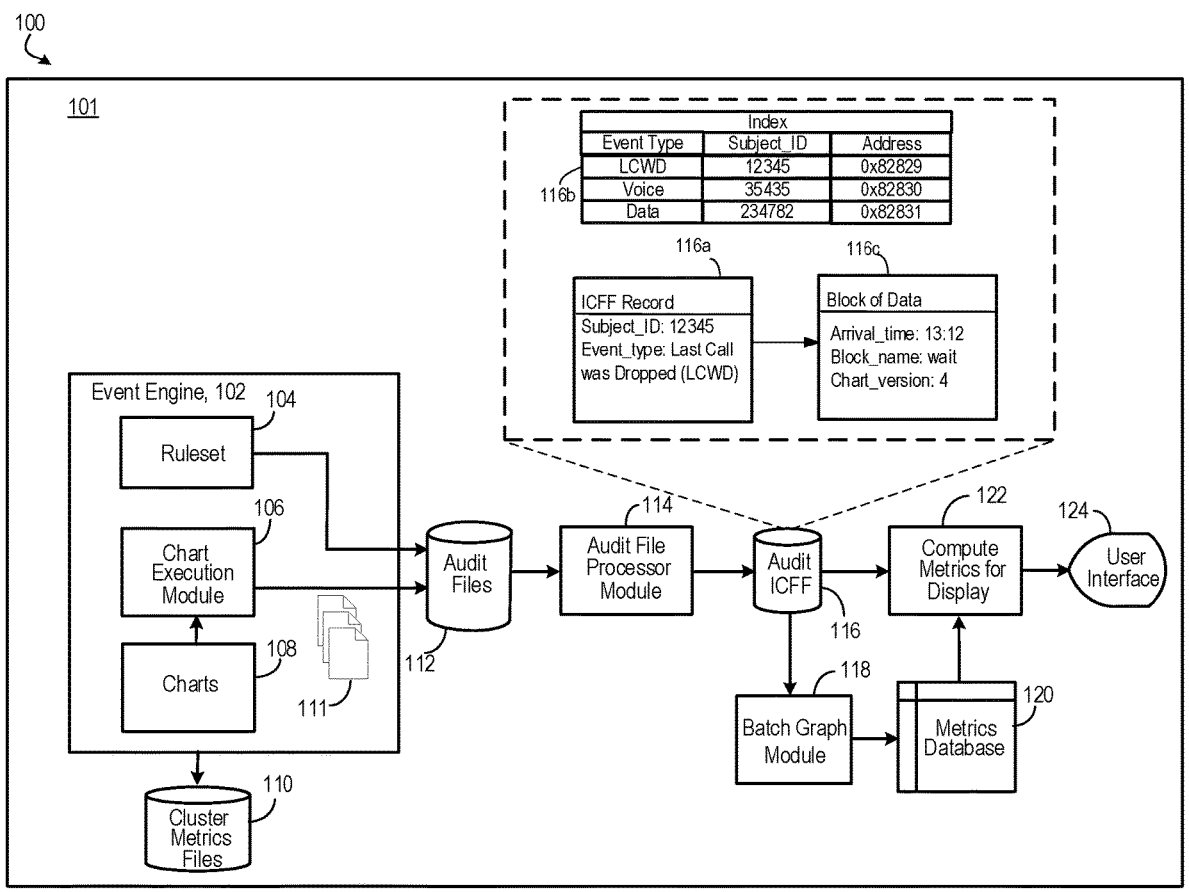
FIG. 4 is a diagram of a system for key-based logging for processing of structured data items with executable logic.

Referring to FIG. 4, environment 100 illustrates an architecture for audit logging. Environment 100 includes system 101 (e.g., a data processing system) with event engine 102, which is configured to process data records (and/or other structured data items). In this example, event engine 102 includes ruleset logs 104, chart execution module 106 and charts 108. Environment 100 also includes databases 110, 112. In this example, ruleset logs 104 includes logs (e.g., logging data or rule case trace information (also referred to herein as tracing information) indicative of which rules are executed, when they are executed, values of parameters and/or values set during execution and so forth) generated execution of rules in a business rules environment (BRE), as described in U.S. Pat. No. 7,877,350, the entire contents of which are incorporated herein by reference. In this example, event engine 102 harvests rule case trace information from the business rules environment to optionally include that information in the audit records (e.g., to account for business logic that handled by rulesets and not in chart decision blocks). In an example, the BRE implements a logging data stream by writing its logs to a port on a graph component and then writing the logs from the port to file. In this example, event engine 102 intercepts that logging data stream by replacing a function call that writes out the tracing information in the BRE with a function call that stores the tracing information in the event engine's internal data structures where the event engine 102 is collecting audit records (and other audit information) for a current event. In some example, the event engine 102 intercepts the logging data stream by providing an alternative implementation of the logging function that the BRE is using (e.g., write_to_log). In other example, the BRE supports an option to use a different function.

In this example, chart execution module 106 is configured to execute one or more dataflow graphs (e.g., one of charts 108). In this example, one of charts 108 is an event engine graph that generates cluster metrics and writes them directly into a file in database 110. Generally, an event engine graph is a graph to monitor performance of the event engine 102. Generally, cluster metrics refer to details at an aggregate level of a system and/or the event engine 102—such as performance details, e.g., metrics indicative of which portions of a dataflow graph are traversed and aggregate metrics indicative of how many times certain portions of a dataflow graph are traversed by a group of records. In some examples, this file is appended (e.g., to other, previously stored files or updated) on every pulse (e.g., a data push), and a new file is opened each day.

In this example, another data path comes from the event engine business logic (e.g., based on execution of chart execution module 106 that executes charts). When charts execute, chart execution module 106 generates a stream of audit records 111 documenting paths taken through the chart, e.g., such as wait blocks exited, flows traversed and actions sent. In this example, an audit record includes a logged activity stored either in the audit files (i.e., in database 112) or in an indexed compressed flat file (ICFF) stored in database 116. Generally, an audit file includes a file for storing various audit records. In this example, audit records 111 are written to a file at the end of every pulse. In this example, database 112 receives one new file every pulse.

Environment 100 includes audit file processor module 114, which includes a graph that processes raw information (i.e., audit files stored in database 112) and re-formats the raw information into a format for an ICFF. In this example, database 112 transmits the audit files to audit file processor module 114 for re-formatting. In turn, audit file processor module 114 transmits the re-formatted files to database 116, which writes a re-formatted file into an ICFF record 116a; indexed (in index 116) by one or more key fields (e.g., subject ID) and consolidated by time (e.g., hourly or daily). In this example, ICFF record 116a references (e.g., via a pointer or another referencing data structure) block of data 116c. In this example, while portions of the raw information are reformatted for ICFF record 116a (which is then indexed in index 116b) other portions of the raw information are stored in block of data 116c, which is referenced by ICFF record 116a and thereby identifiable and accessible via ICFF record 116a.

In some example, the audit records and/or audit files are reformatted for the ICFF by batching audit records together at a specified granularity (e.g., one event for one subscriber for one chart), computing key fields that will be stored on an ICFF record (e.g., fields for event type, subscriber ID, timestamp, chart instance ID, etc.) and then grouping the remaining audit records together in a collection, as follows:

In an example, event engine 102 generates audit records that are optimized for space efficiency (e.g., rather than being optimized for query efficiency). In this example, the audit records are optimized for space efficiency, e.g., by not having every audit record include a timestamp, subscriber_ID and so forth. To place these audit records into the ICFF, the system described herein needs to use more complete records (e.g., that include the timestamp and subject ID on every audit record) so that the system described herein can search for individual records (e.g., that are based on contents of the audit records) efficiently.

In some examples, database 116 includes a relational database, rather than an ICFF, as the goal of implementation of database 116 is to be able to query for sequences of events. To do so, the sytem transforms the stream of audit records into one or more records (e.g., ICFF records). Each record includes one or more indexable/searchable key fields and a collection of data representing a remainder of the audit events.

In some examples, a level of granularity of a record is one event for one subscriber (e.g., user) for one chart. As such, the system described herein extracts (e.g., from audit files in database 112) a sequence of audit records that corresponds to one event for one subscriber for one chart. This example, the events occur sequentially. Additionally, the audit records for each event are stored sequentially in database 112 (e.g., in a file in database 112). Using the extracted audit records, the sytem generates a record that has a multiple key fields, e.g., including, an event type field, a subscriber ID field, a timestamp field, a chart instance ID field, and so forth. In some example, a first audit record in the sequence includes values for these multiple key fields. The system uses these included values in generating the new record. Additionally, the system constructs a block of data corresponding to remaining audit records for that sequence. The system stores that block of data as collection of data (e.g., as a Binary Large OBject (BLOB)) in database 116 as part of the generated new record or associated with the generated new record (e.g., by having the generated new record reference collection of data or blob).

Using the generated records and/or collections of data, the system can query to the ICFF (or database 116) for various information, e.g., such as, "what happened when subscriber 12345 got event 7 on June 8th?" and then display the sequence of decisions taken inside the event engine and associated rulesets for that event. In another example, the system queries the ICFFF (or database 116) with the following query: "what happened when subscriber 12345 sent a message on June 8th?" In this example, to answer this query, the generated, new records includes another key field to identify that a message action was triggered (or not). As such, based on the range of queries to be supported, the system selects which key fields to include in the record.

In this example, database 116 stores raw metrics in ICFF. In this example, environment 100 also includes metrics database 120, with an interface for accessing the metrics. Therefore, environment 100 includes batch graph module 118 that runs a batch graph (e.g., every 10 minutes) to aggregate the raw metrics and to write them into metrics database 120. Environment 100 also includes batch graph module 122 that is run "as needed" to compute metrics (such as one or more states prevailing in system 100) for display, e.g., in user interface 124. In this example, batch graph module 122 accesses metrics from metrics database 120 and/or from database 116 and processes those accessed metrics for display in user interface 124. In this example, the graph generated or executed by batch graph module 118 has no persistent state and a metric state is persisted in metrics database 120. As such, match graph module 120 queries metrics database 120 for metrics for display in user interface 122. In an example, various types of user interfaces are displayed, including, e.g., a dynamic display of metrics, reports on metrics and an investigation interface, each of which are described below:

In a dynamic display of metrics, a console displays metrics (e.g., aggregate counts) and in displays updates those metrics in near-real time. The system queries metrics database 120 for this data and metrics. In this example, the console is a web user interface (UI), which includes a polling interface that can only pull data from a server (e.g., on a timer or at specified time). As such, the graph generated by batch graph module 118 cannot push data to the UI. Instead, the UI (e.g., web page) intermittently queries the server for updated counts to display. The updated counts will be stored in the metrics database 120. In this example, there is server side logic to interface between the UI (web page) and the metrics database 120, including, e.g., a Java application server sitting between a browser and the database.

In another example, user interface 124 displays reports on the metrics queried from metrics database 120. In this example, users will be able to look at the metrics in reports and dashboards. The metrics specify how many people enter each campaign, how many people traversed each branch (e.g., of a chart), how many people got an offer, how many people accepted the offer, etc. The user interface includes controls to "drill down" to more details in this report. To drill down (e.g., to answer a query of "what happened for these 10 subjects who saw the trigger event but did not get the offer"), the system accesses the records in the ICFF in database 116. To implement these reports, the system implements a service side module (which in this example is batch graph module 122), which can access metrics database 122 and database 116 when there is drill down.

In still another example, user interface 124 includes an investigation interface, in which users can ask questions, such as "what happened when subscriber 12345 got event 7 on June 8th?" To answer these questions, the system queries the ICFF (e.g., in database 116)—using a server side module (e.g., Java, a graph and so forth) between user interface 124 and the ICFF in database 116.

Event engine 102 creates multiple different types of audit records to store in an ICFF in database 116. The below Table 1 specifies the different types of audit records, with their corresponding fields. Some of the below audit record types are optional depending on the level of logging. In this example, an ICFF stores a list of fields, corresponding the fields shown in the below Table 1, e.g., for use in generating the key fields of the ICFF record—as described above. Values for fields that are italicized in the below Table 1 are not generated by the event engine 102, but are inferred by the system described herein by looking backwards through the audit stream when data is written into the ICFF. This means that the event engine 102 needs to generate significantly less data. In the below Table 1, the "?" column indicates whether the audit record is optional. A "+" sign means the audit record is generated by event engine 107. A letter means that the audit record is optionally generated and is controlled by a set of related control points and an asterisk indicates that that record type is enabled by default.

TABLE 1

| Name | Fields | ? | Details |
|---|---|---|---|
| Event seen | timestamp, protocol_version, subject_id, event_type, actual_time, source_time, arrival_time | + | This is the first event in a sequence. The event engine generates this record type when the event engine first sees the event or alarm for a subscriber. It may be followed by processing for multiple charts. The event_type can be −1, which means alarms are being processed by the event engine. The protocol_version provides a way to change the semantics of the audit sequence. The timestamp is the logical time. It will apply to all the events in the rest of the sequence. Actual_time is physical time. Source_time is the best estimate of the time when the event was created at the source. Arrival_time is when the event was first collected by the system. |
| Processing time | timestamp, subject_id, event_type, processing_time | + | At the end of processing an event or a series of alarms, this is the total time spent doing processing of that event/alarms. This is the last audit record in a sequence that starts with Event seen. |
| Chart registered | timestamp, subject_id chart_version, chart_name, source_rpath, chart_hash | + | Whenever the event engine registers a chart, or changes a chart registration. Chart_version is a computed hash of (chart_name, source_rpath, chart_hash). |
| Chart start | timestamp, subject_id instance_id, chart_version, monitoring_name | + | This audit record type specifies when a chart instance starts. |
| Alarm dispatch | timestamp, subject_id, instance_id, alarm_time | + | The system generates this audit record when an alarm is seen for a subscriber, for a chart. |
| Event dispatch | timestamp, subject_id, instance_id, block_name | + | This audit record is generated by the sytem when a chart is waiting for an event and that event occurs. This does not necessarily mean that the wait conditions were satisfied. |
| Chart done | timestamp, subject_id, instance_id, time_started | + | This audit record type specifies that a chart is dropped. In this example, the instance_id represents the chart being dropped, not the chart doing the dropping (which may be the chart manager). The time_started is the timestamp on the corresponding chart start audit record (which may have been days or weeks ago). |
| Block entered | timestamp, subject_id, instance_id, block_name | + | When a wait block is entered with or without a timeout. |
| Action sent | timestamp, subject_id, instance_id, block_name, action_type | + | This type of audit record specifies when an action is sent (e.g., as part of a campaign). |
| Block exit - event | timestamp, subject_id, instance_id, block_name, time_entered | + | The event engine generates this type of audit record when a block is exited. The time_entered is the timestamp of the corresponding Block entered audit record (which may have been days ago). |
| Block exit - alarm | timestamp, subject_id, instance_id, block_name, time_entered | + | The system generates this audit record, when a block (e.g., a graph component) is exited. |
| Decision taken | timestamp, subject_id, instance_id, block_name, block_result | D* | When a decision block is tested. The result is the result of the decision, which determines which link is taken. |
| Monitoring point | timestamp, subject_id, instance_id, point_name, point_value | P* | Each monitoring point (which are associated with links) has a condition and an expression. The event engine generates an audit record when the condition is true, then the event engine computes the expression and records the resulting value. |
| Ruleset called | timestamp, subject_id, instance_id, ruleset_name | R | This audit record type specifies when a ruleset is about to be called by the event. |

TABLE 1-continued

| Name | Fields | ? | Details |
|---|---|---|---|
| Rule event | timestamp, subject_id, instance_id, ruleset_name, opCode, group, index, nullFlag, value | R | When a ruleset is called from a chart, the event engine converts ruleset audit events into an audit record. |
| Variable set | timestamp, subject_id, instance_id, variable_name, variable_value | S | When the event engine sets either a shared variable or a chart instance variable. |
| Variable read | timestamp, subject_id, instance_id, variable_name, variable_value | V | When the event engine reads either a shared variable or a chart instance variable. |
| Monitoring point | timestamp, subject_id, instance_id, point_name, point_value | P * | Each monitoring point (which are associated with links) has a condition and an expression. The event engine generates an audit record only when the condition is true and computes the expression and records the resulting value. |
| Error dispatch | timestamp, subject_id, instance_id, error_message, not_handled | + | This audit record type indicates that an error occurred while executing the chart. |

In an example, database 112 groups (e.g., continuously or intermittently) audit records for each subject (e.g., by key). That is, the audit records are automatically grouped by subject or key. As a result, event engine 102 does not need to duplicate the timestamp, subject_id or instance_id in each audit record in the audit file (e.g., per pulse). Rather, database 112 can obtain values from these fields based on previously occurring values of these fields in the group. In this example, no state needs to be preserved between pulses. This means, for example, that block exit audit records need to have the block_name since the block entry audit record may have been many pulses ago. In the database 112, audit records will be complete with relevant fields shown in the foregoing Table 1.

In an example, the system detects an occurrence of an event for a subject (e.g., a user or a subscriber) for a chart. As such, event engine 102 generates an "event seen" audit record, then an "event dispatch" audit record and then a "block exit—event" audit record. From these audit records, the system (e.g., audit file processor module 114) obtains values for the following fields: event_type, timestamp, and instance_i. In this example, the systems collects these audit records together in one blob, and the key fields (e.g., of event_type, timestamp and instance_id) are set, by the system, in another record (e.g., an ICFF record) from the data seen (e.g., from the audit records).

In another example, a timeout happens for a subject for a chart. In this example, event engine 102 generates the following audit records: an "event seen" audit record of type alarm, then an "alarm dispatch" audit record and then a "block exit—alarm" audit record. From these audit records, the system determines values for the following key fields: the event type, timestamp, and instance_id. In this example, the system determines a value of the instance_id field from the block exit—alarm audit record, e.g., rather than inferring a value of that field. In this example, the system collects these audit records in a blob and the key fields (e.g., event_type, timestamp, instance_id, etc.) are set by the system from the data seen (e.g., the audit records).

In still another example, an event happens for a subject that starts a chart. In this example, the event engine 102 generates an "event seen" audit record (which may be of type start chart or may be of another type), then an "event dispatch" audit record and then a "chart start" audit record. From these audit records, the system obtains values for the following key fields: event_type, timestamp, and instance_id. The system collects the audit records in a blob and the key fields (of event_type, timestamp, instance_id, etc.) are set from the data seen (e.g., the audit records).

Because the audit records are grouped together by key, a subset of audit records associated with a particular key do not include the key field. For example, database 112 or audit file processor module 114 may receive the following sequence of audit records: an event seen audit records, an event dispatch audit record, a block exit—event audit record. In this example, database 112 or audit file processor module 114 obtains the subject ID (e.g., the key) from the event seen audit record. As such, the event engine 102 does not need to duplicate the key in the event dispatch and block exit audit records, since these audit records will be sequential in memory (e.g., in database 112 or other system memory) after the event seen audit record. Similarly, the event dispatch audit record include the instance ID field. As such, the event engine does not need to copy of include this field in the block exit audit record. Since, the system groups audit records memory (and on disk), the system does not need to copy the key across all audit records in a group, thereby conversing system resources and reducing an amount of memory consumption.

To avoid generating excessive amounts of data, users have control over when the event engine generates audit records and which audit records are generated. Although auditing (and therefore metrics) can be turned off entirely, if auditing is turned on, then the core set of audit records (marked with a plus sign in the earlier table) are not disabled. The core set of audit records tracks event engine inputs (events and alarms), outputs (actions), errors and chart and wait block activity. Generally, an alarm includes a predefined type of data record (e.g., that a chart sends itself) that arrives at a pre-calculated time in the future. The other audit record types can be selectively enabled and disabled. There are two dimensions to enabling optional audit records—what should be enabled and when it should be enabled. For the what, there are a number of distinct groups of audit records that can be selectively enabled/disabled. They include:

A: Alarm set (on by default)
D: Decision taken (on by default)
P: Monitoring point (on by default)
R: Ruleset called and Ruleset event
S: Variable set
V: Variable read
L: Lookup access and Lookup variable For the when, logging of these audit events can be enabled for everything or limited based on one or more of the following:

Only for a specified set of subject ids (e.g., keys)
Only for a specified set of chart named and/or monitoring names
Only for a specified set of event types (e.g., record types)

In an example, the event engine 102 configures the logging of these audit records through control points. Generally, a control point includes a run-time parameter that is defined by a user (generating a chart) and is used to change the behavior of one or more charts (or chart instance) at run-time. In this example, audit records are controlled (e.g., by the event engine) by a set of four interrelated control points. The five control points are:

Audit Types—This is a list of the audit record types to be turned on—using the letters listed in above Table 1.
Audit Entities—This is a list of subject ids. If not blank, then the event engine will only generate the audit record types in the Audit Types list for subject ids included in this list. (Otherwise, all subject ids will be audited).
Audit Events—This is a list of event types (e.g., numbers corresponding to or representing event types). If not blank, then the event engine will only generate audit record types in the Audit Types list for types of events included in this list. (Otherwise, all events will be audited). There are various types of events, including, e.g., an event specifying that an SMS message was sent, an event specifying that a user renewed a mobile plan, and so forth.
Audit Charts—This is a list of chart names and monitoring names. If not blank, the event engine will generate audit record types in Audit Types for charts whose chart name or monitoring name is included in this list. (Otherwise, all charts will be audited).
Audit Variables—This includes a comma separated list of variable names. If not blank and the event engine is configured to generate audit record types for variables (e.g., variable set or variable read), then the event engine will only generate an audit record if the variable name is in this list.

In some examples, the event engine 102 applies different rules to different groups of audit records. In this example, there is a first group of audit records (e.g., a first audit group) with a first set of rules (e.g., Audit Types 1, Audit Entities 1, Audit Events 1, Audit Charts 1 and Audit Variables 1) and a second group of audit records (e.g., a second audit group) with a second set of rules (e.g., Audit Types 2, Audit Entities 2, Audit Events 2, Audit Charts 2 and Audit Variables 2), and so forth.

In this example, each of the audit types, audit entities, audit events, audit charts and audit variables include a type of filter. If any or all of these filters are set, then only a subset of the events will have extra auditing (e.g., auditing that includes optional forms of auditing).

In an example, the sytem is configured for minimal auditing by implementing a first audit group, as follows:
Audit Types 1="" (enable nothing optional)
Audit Entities 1="" (all subject IDs)
Audit Events 1="" (all event types)
Audit Charts 1="" (all charts)
Audit Variables 1="" (all variables, although this is ignored since the system is configured to turn off optional variable logging).

Now, in another example, system is configured to assess why an offer to subject_ID 12345 is never sent, even though this subject number meets all the criteria for sending the offer. The chart that implements this offer is "My Offer Chart" and the triggering event is number 6. To get all lot more details for this particular subject ID about why the offer is not sent, the system is configured with a second audit group, as follows:
Audit Types 2="ADPRSVL" (enables all audit types)
Audit Entities 2="12345" (only this subject ID)
Audit Events 2="6" (only this event type)
Audit Charts 2="My Offer Chart" (only this chart)
Audit Variables 2="" (all variables).

In this example, when an event occurs, the system first checks to see if the subject ID is in the list of Audit Events 2 and the event type is in the list of Audit Events 2 and the chart is in the list of Audit Charts 2. If all of these attributes (e.g., filters) evaluate to true, the system implements all audit record types as specified in Audit Types 2, which will start optional logging for the duration of that event. If not, the system implements Audit Types 1, which just logs the default. In this example, the system is configured to check a highest numbered group first and work backwards until a matching group is found. If no matching group is found, the system implements and uses defaults. In a variation, the system may be configured to take a union of all matching groups that add more optional logging.

In this example, the event engine 102 implements condition audit logging (e.g., via implementation of a monitoring point audit record) and optimizes its execution performance. To optimize this performance, the event engine 102 pre-calculates (e.g., pre-generates) data structures for making conditional audit decisions. Generally, a conditional audit decision specifies that an audit record is generated what a condition evaluates to a specified value (e.g., true or false). In this example, the event engine does the conditional audit calculations at the beginning of event processing for an event or alarm. For example, the event engine performs the calculation (e.g., in the above described audit groups) every time the event engine detects an event or an alarm—but only at the beginning of processing of each event or alarm (e.g., rather than on every audit record). The event engine saves the conditional audit calculations in a package of global variables and queries inside each of the auditing functions that can be conditional.

For each audit record type, the event engine 102 implements a single flag that specifies whether audit records for that audit record type are being generated. The event engine 102 analyzes contents of the Audit Entities and Audit Events lists in implementing the single flag, since both of these lists are specified or generated when the event processing starts. Because one event can be processed by many charts, the event engine determines, per chart, whether an audit function (e.g., audit record type) is being implemented. If Audit Charts is not blank, the event engine will convert contents of the Audit Charts into a list of instance ids (that each identify a chart) to simplify comparison among an id of a chart that is being implemented and the instance ids that specify which charts are generating audit records (and which types of audit records).

In an example, the event engine 102 collects the audit records in an array in memory (e.g., either in the event engine 102 or in a system that includes event engine 102) and then writes the audit records out to the audit file in one block at the end of processing of an event or a stream of events. In this example, audit records from different events (i.e., events associated with different keys or user IDs) are not intermixed in memory. Rather, the memory is partitioned and each partition had its own audit file. As such, the event engine 102 is configured to automatically group audit records together by key.

In this example, the audit file is versioned. There will be one instance of the audit file for each pulse. The audit files will accumulate on disk and an audit file processing graph (executed by audit file processor module 114) will pick up each audit file (from each partition) at the end of the pulse and post-process the audit records, writing them into the ICFF.

In this example, the system generates metrics database 120 by post-processing the audit records from the ICFF (in database 116), e.g., rather than reading the audit records from memory in the event engine 102. In this example, ICFFs are not purged. As such, the metrics database 120 can be recreated at any time including using different aggregation periods. In this example, a table in metrics database 120 has a cluster_name column such that one database can be used for multiple clusters. Generally, a cluster includes an event engine instance. Generally, an event engine instance includes a specific realization of one or more specifications (for which one or more charts are executed by event engine 102) for a unique value of a key. That is, each subject ID is handled by exactly one event engine instance. So, for each unique key (e.g., subject ID), there will be exactly one event engine instance that has all of its charts. Audit records for a same cluster will have the same value of cluster_name.

In this example, metrics database 120 can be queried for metrics that are indicative of a state of event engine 102—such as a total number of events processed by the event engine 102 (e.g., based on the event seen audit records), a number of events that resulted in an error (e.g., based on the error dispatch audit records), a number of events that trigger a campaign (e.g., based on the action sent audit records), which subscribers move from one stage to another stage for a particular campaign (e.g., based on the block entered audit records), a number of subscribers that were canceled or added in the event engine for a particular day (e.g., based on the chart start and chart done audit records), a number of total charts that are running in the event engine (e.g., based on the chart start audit record) and that track a state of the event engine 102 as events are being processed by the event engine.

Additionally, the metrics database 120 can be queried (e.g., by a client device or the system described herein) to retrieve data specifying reasons that messages were not sent for a particular key (e.g., for each subscriber). To do so, the event engine is configured to log links taken (and/or components executed within a chart) and ruleset cases accessed and implemented via the event engine 102 (e.g., by producing audit records specifying which components and/or links are executed). The system is then configurable to compare a path through a chart that is taken (e.g., as specified by the audit records) to all potential paths through a chart to determine why a particular message was not sent (e.g., because a path corresponding to the message being sent was never traversed because an alternate path was traversed—as specified by the audit records).

Figure 5:
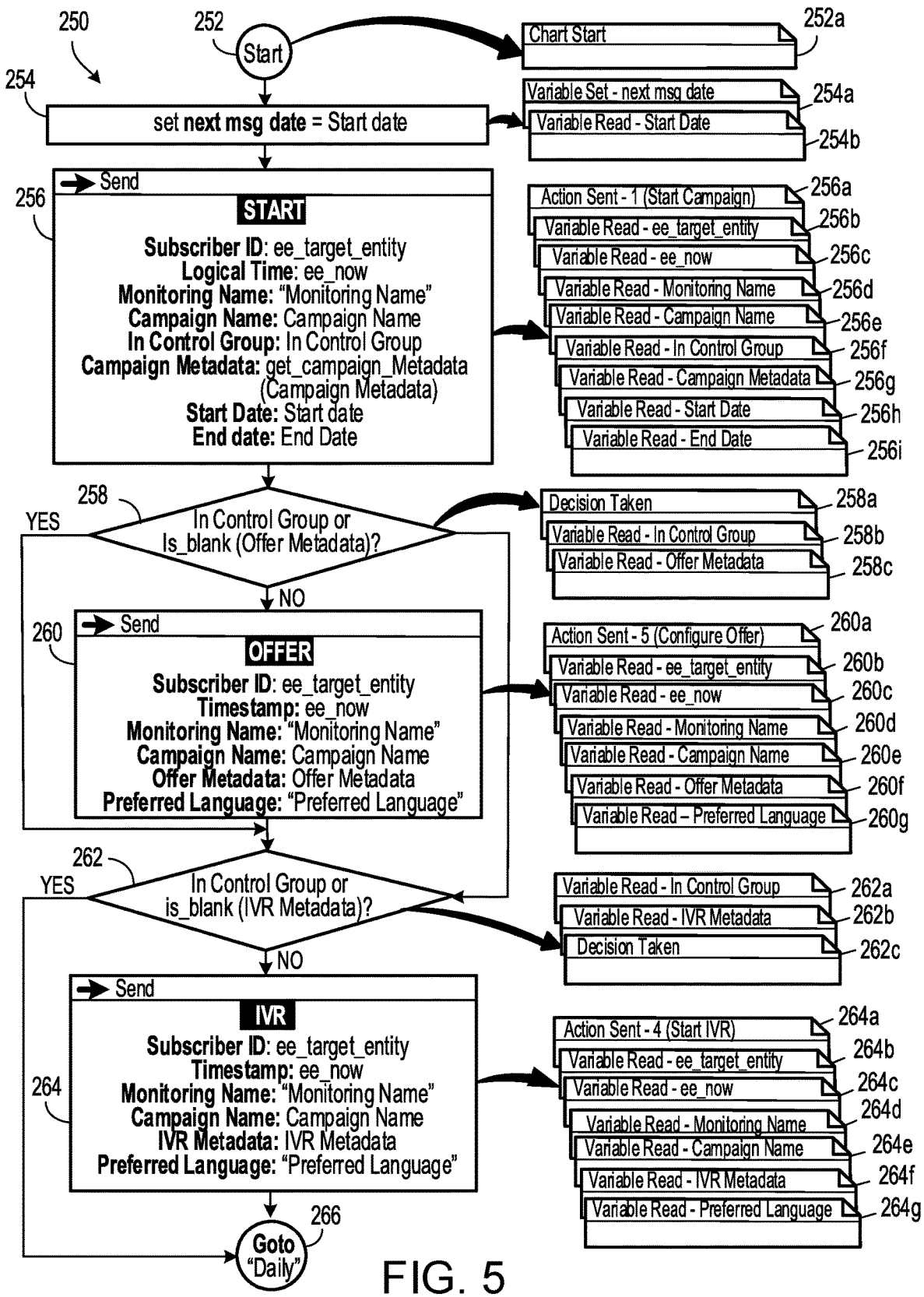

Referring to FIG. 5, chart 250 includes nodes 252-266. In this example, each of nodes 252-264 represents a data processing component that includes code for automatically generating one or more audit records. For example, node 252 represents a data processing component that is configured to generate a chart start audit record 252a. Node 254 represents a data processing component that is configured to generate a variable set audit record 254a and a variable read audit record 254b. In this example, variable set audit record 254a specifies the name of the variable that is being set. In this example, the name of the variable is "next msg date." Variable read audit record 254b specifies the name of the variable that is being read. In this example, the name of the variable being read is "Start date." A data processing component represented by node 256 generates audit records 256a-256i. A data processing component represented by node 258 generates audit records 258a-258c. A data processing component represented by node 260 generates audit records 260a-260g. A data processing component represented by node 262 generates audit records 262a-262c. A data processing component represented by node 264 generates audit records 264a-264g. In this example, "next msg date" is the next date that the event engine will process messages. In this example, "next msg date" is set to be the first date of the campaign. In this example, as soon as chart 250 is started (which may be before a campaign starts), the event engine sends the START, OFFER and IVR actions that are represented by nodes 256, 260, 264, respectively. In this example, the START, OFFER and IVR actions are three actions sent by a chart. The system sends a START action when a subject has triggered a campaign. The system sends an OFFER action to configure an external subsystem for the offer (e.g., get 10 minutes free when you recharge your account) and an IVR action to configure the external subsystem that handles incoming telephone calls (e.g., "tell me what offers are available for me."). In this example, if corresponding metadata is blank, or if a subscriber (represented by a key) is in a control group (as represented by node 258), chart 250 does not progress to node 260 (and thus does not send the OFFER action) and instead progresses to node 262. In this example, if corresponding metadata for an IVR is blank, or if a subscriber (represented by a key) is in a control group (as represented by node 262), chart 250 does not progress to node 264 (and thus does not send the IVR action) and instead progresses to node 266 to check to see if the event engine needs to execute daily message processing, as represented by node 266.

Figure 6:
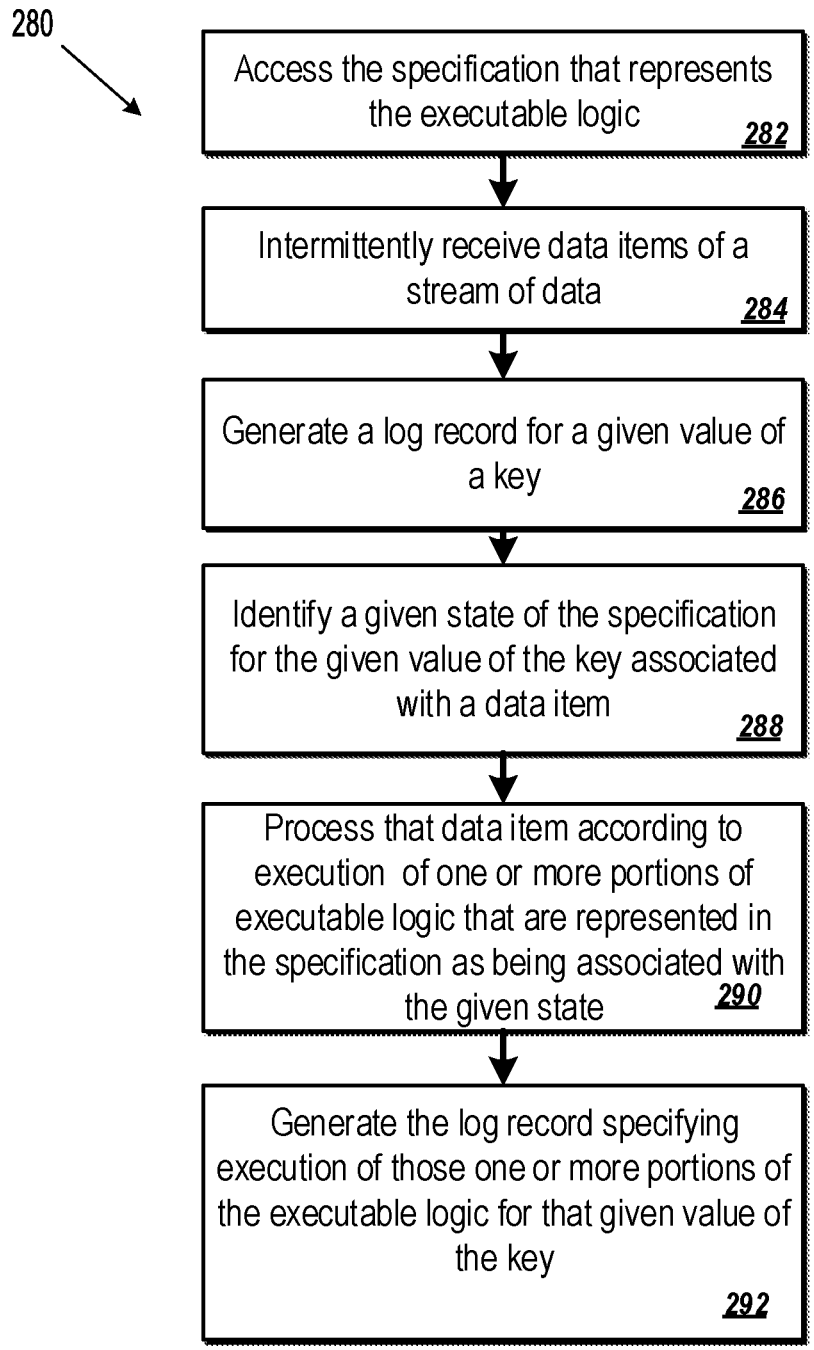
FIG. 6 is a diagram of an example process in key-based logging for processing of structured data items with executable logic.

Referring to FIG. 6, process 280 is implemented by a data processing system for identifying one or more portions of executable logic that are executed in processing one or more data items that are each associated with a given value of a key, wherein a specification represents the executable logic, wherein the specification is associated with the key and wherein states of the specification are maintained for respective values of the key.

In operation, the data processing system accesses (282) the specification that represents the executable logic, wherein a state of the specification for a particular value of the key specifies one or more portions of the executable logic that are executable in that state. The data processing system also intermittently receives (284), e.g., over an input device or port, data items of a stream of data, with one or more of the data items each being associated with the given value of the key. The data processing system generates (286) a log record for the given value of the key, with the log record specifying the one or more portions of the executable logic that are executed in processing the one or more of the data items that are each associated with the given value of the key. In this example, the generating includes, for each of the one or more of the data items associated with the given value of the key, the following operations: The data processing system identifies (288) a given state of the specification for the given value of the key associated with that data item. The data processing system processes (290) that data item according to execution of one or more portions of executable logic that are represented in the specification as being associated with the given state. The data processing system generates (292) the log record specifying execution of those one or more portions of the executable logic for that given value of the key.

Figure 7A:
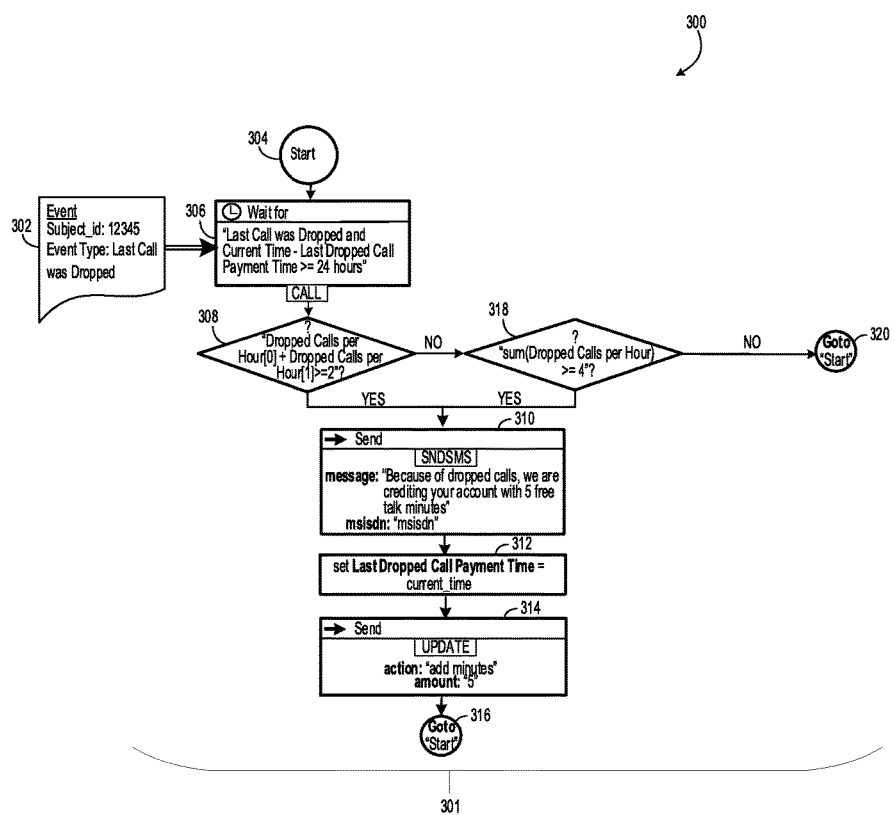
FIGS. 7A-7H are diagrams illustrating the generation and indexing of an ICFF record and associated block of data.

FIGS. 7A-7H illustrate generation of an ICFF record and a block of data from audit records generation during execution of a chart. Referring now to FIG. 7A, diagram 300 includes a chart 301 with components 304-316. In a real-world example, the chart 301 is configured to be executed, e.g., by a telecom company that wants to compensate customers who are experiencing multiple dropped calls. Specifically, if a customer experiences two dropped calls in the last two hours (as specified by component 308), or if there have been 4 dropped calls across the entire day (as specified by component 318), the telecom company will add 5 minutes to your account (as specified by components 310, 314). The company will only pay out once every 24 hours (as specified by components 306 and 312). The chart 301 runs with no expiration date. In this example, the system described herein executes the chart 301.

Figure 7B:
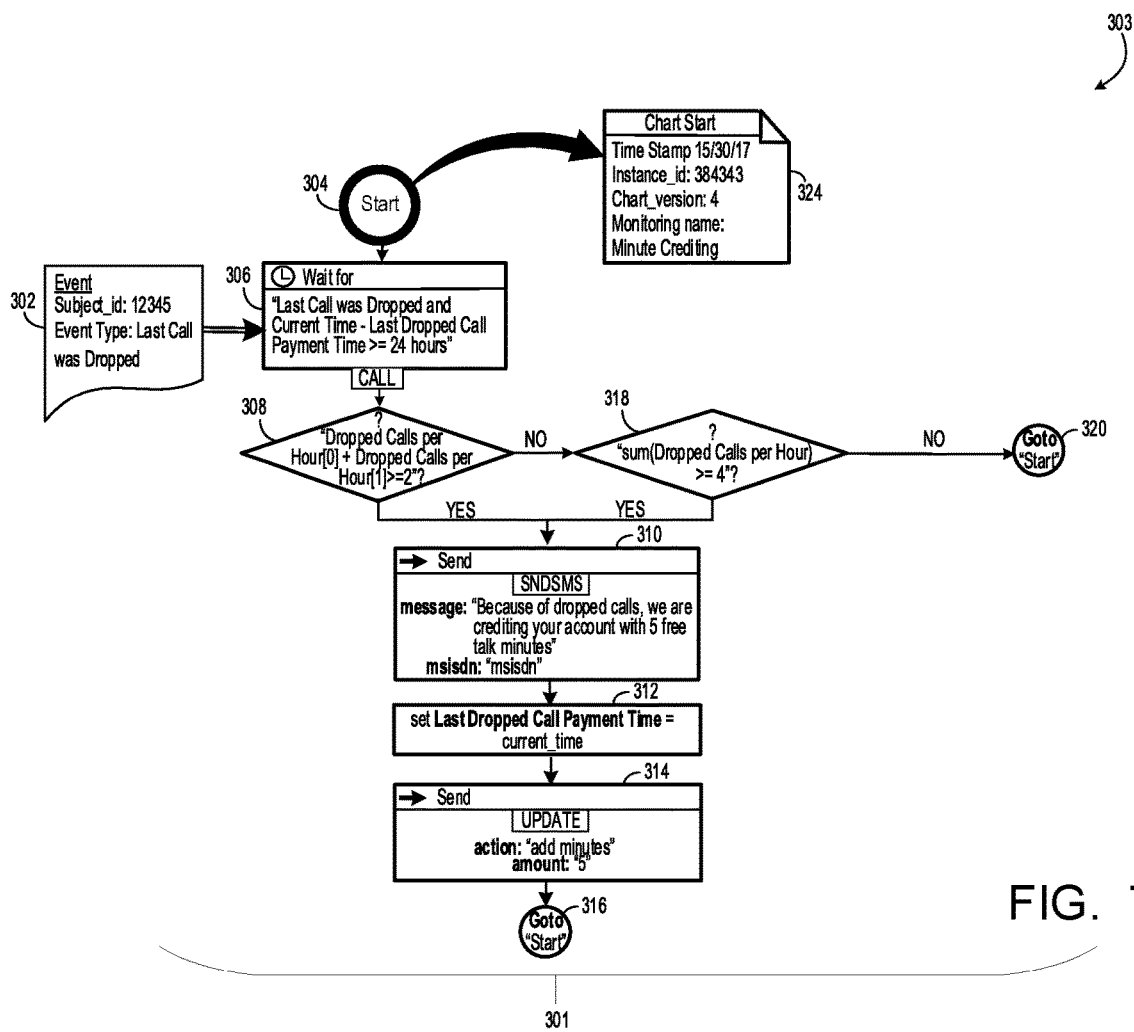
Figure 7C:
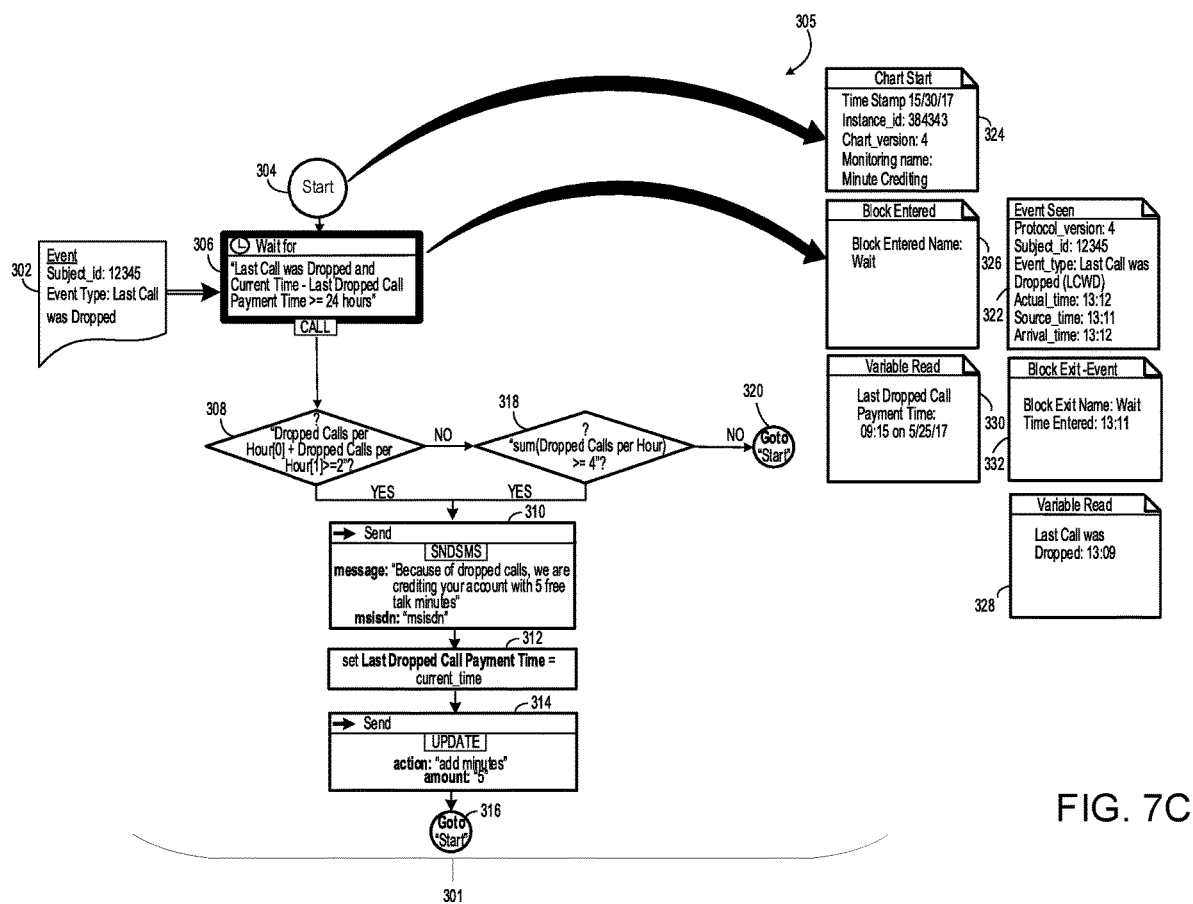

Referring to FIG. 7B, diagram 303 illustrates a state of chart 301, in which chart 301 has started execution. At the start of the chart 301, the chart 301 is in a first state in which component 304 is executed (as illustrated by the dark line around component 304), which causes the system to generate audit record 324. Referring to FIG. 7C, diagram 305 illustrates that the chart 301 progresses to a second state in which the system waits for a specified event and then makes various decisions and performs various actions upon detection of the event. In this example state, the system executes component 306 (as specified by the dark line around component 306) and the system generates audit record 326. At component 306, the system is configured to wait for a specified event, e.g., an event specifying that a last call was dropped (i.e., an event type of "Last Call Was Dropped"). In this example, the system receives event 302 (e.g., a structured data item or data record), which includes data specifying that this event is of an event type "Last Call Was Dropped." Upon detection of event 302, the system generates audit record 322 and component 306 (or the system executing the executable logic represented by component 306) determines whether there has been a payout in the last 24 hours (i.e., Current Time–Last Dropped Call Payment Time>=24 hours). In doing so, the system generates audit records 328, 330, each of which specifies the values of read variables. Upon detection of event 302 and that no payment was made in the last 24 hours, the system generates audit record 332 and progresses to component 308, while remaining in the second state.

Figure 7D:
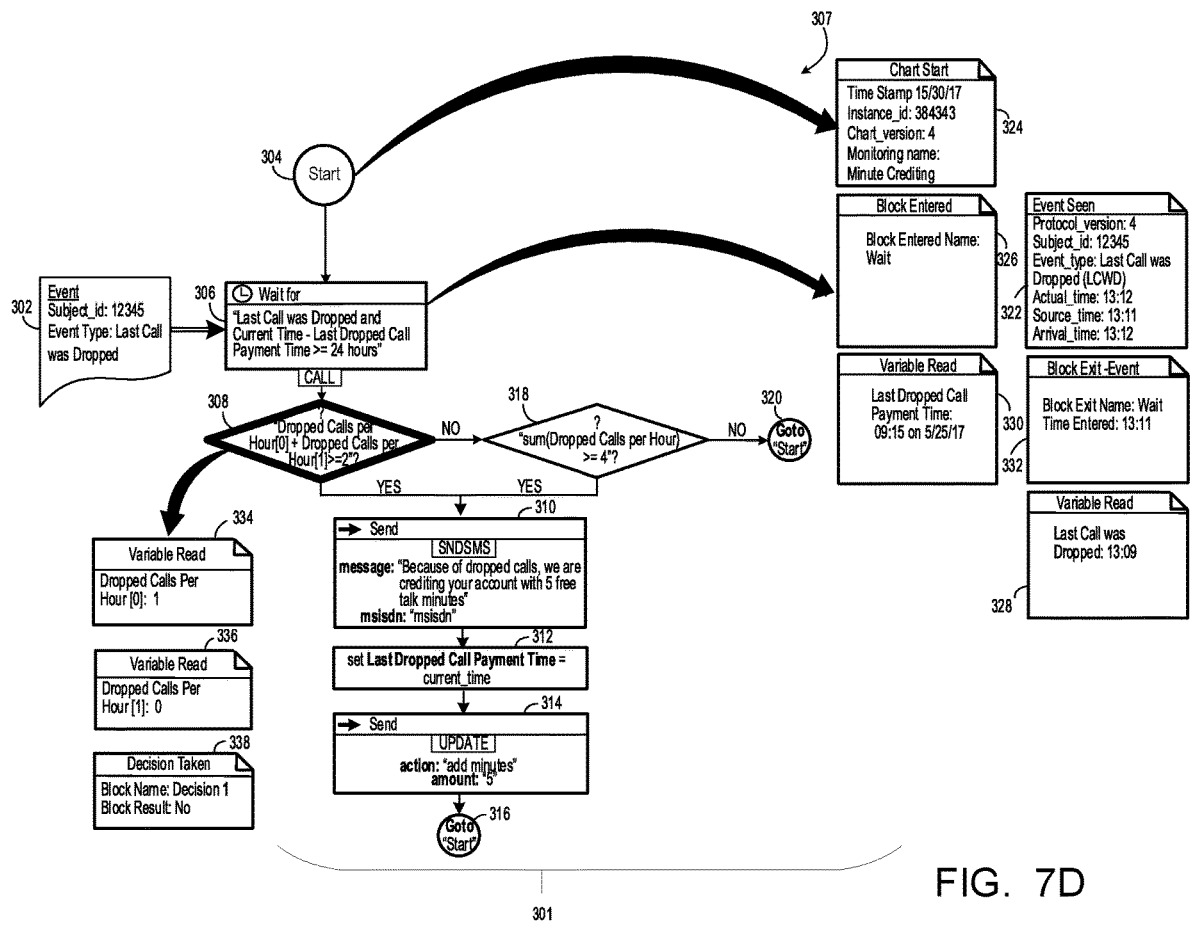

Referring to FIG. 7D, diagram 307 illustrates a state of chart 301 in which the system executes component 308, as indicated by the dark line around component 308. In this example, component 308 (or the system executing the executable logic represented by component 308) generates audit records 334, 336 in reading the values of variables. In this example, the logic represented by component 308 evaluates to a value of "No," based on the values of the read variable.

Figure 7E:
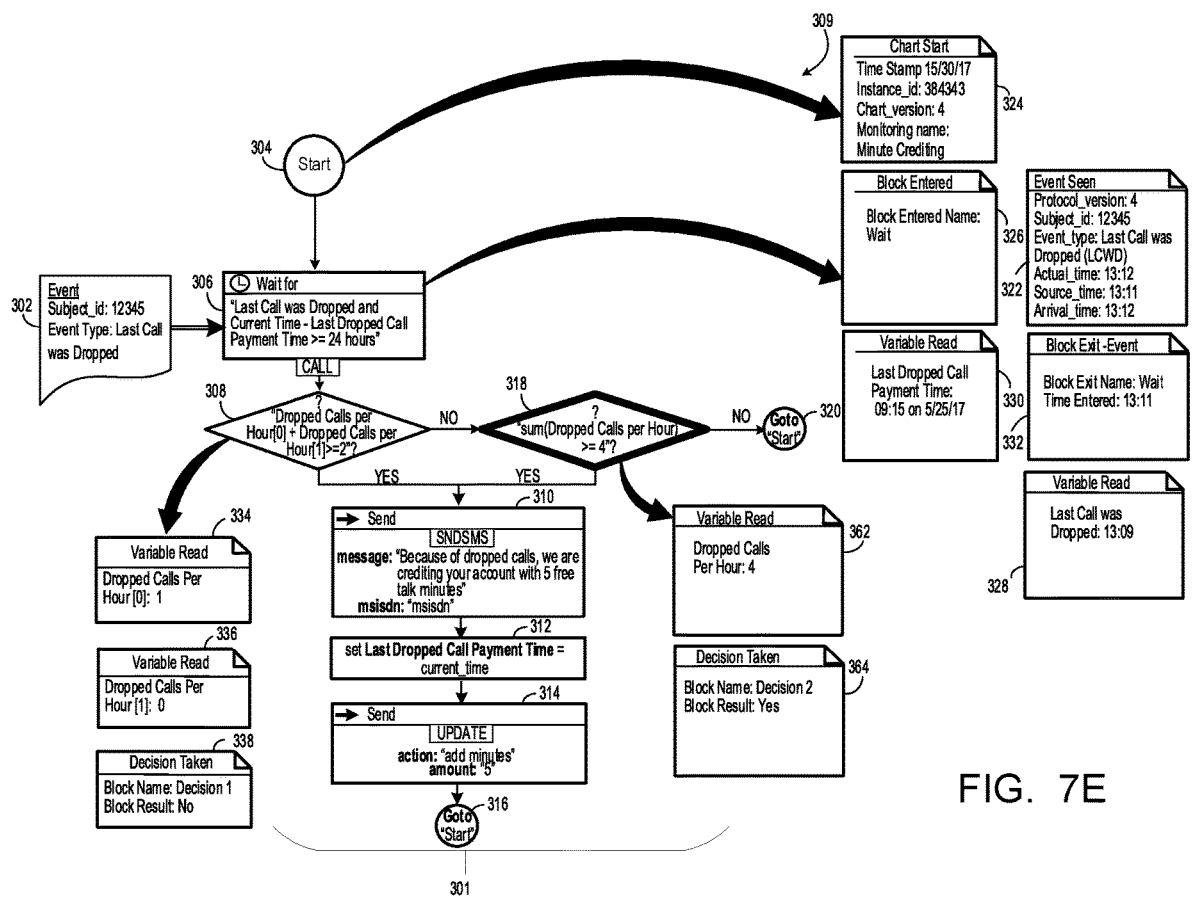

Referring to FIG. 7E, diagram 309 illustrates yet another state of the chart 301 in which component 318 is executed (as illustrated by the dark line around component 318), still while in the second state. At component 318, the system generates audit record 362, which specifies the read value of the "Dropped Calls Per Hour" variable. In this example, the system determines that the logic represented by component 318 evaluates to a value of "Yes" and generates audit record 364, the contents of which specify that component 318 (referred to as "Decision 2") evaluated to a value of "Yes".

Figure 7F:
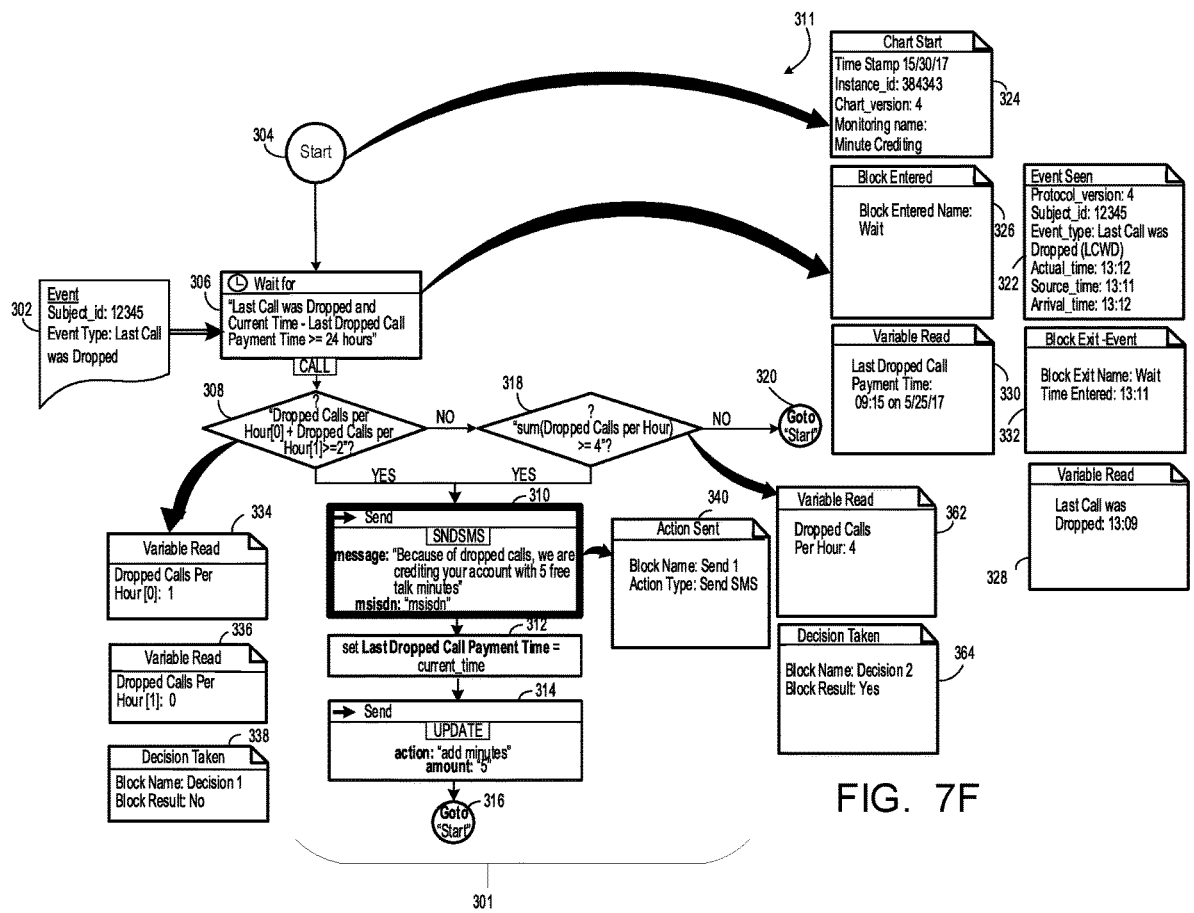
Figure 7G:
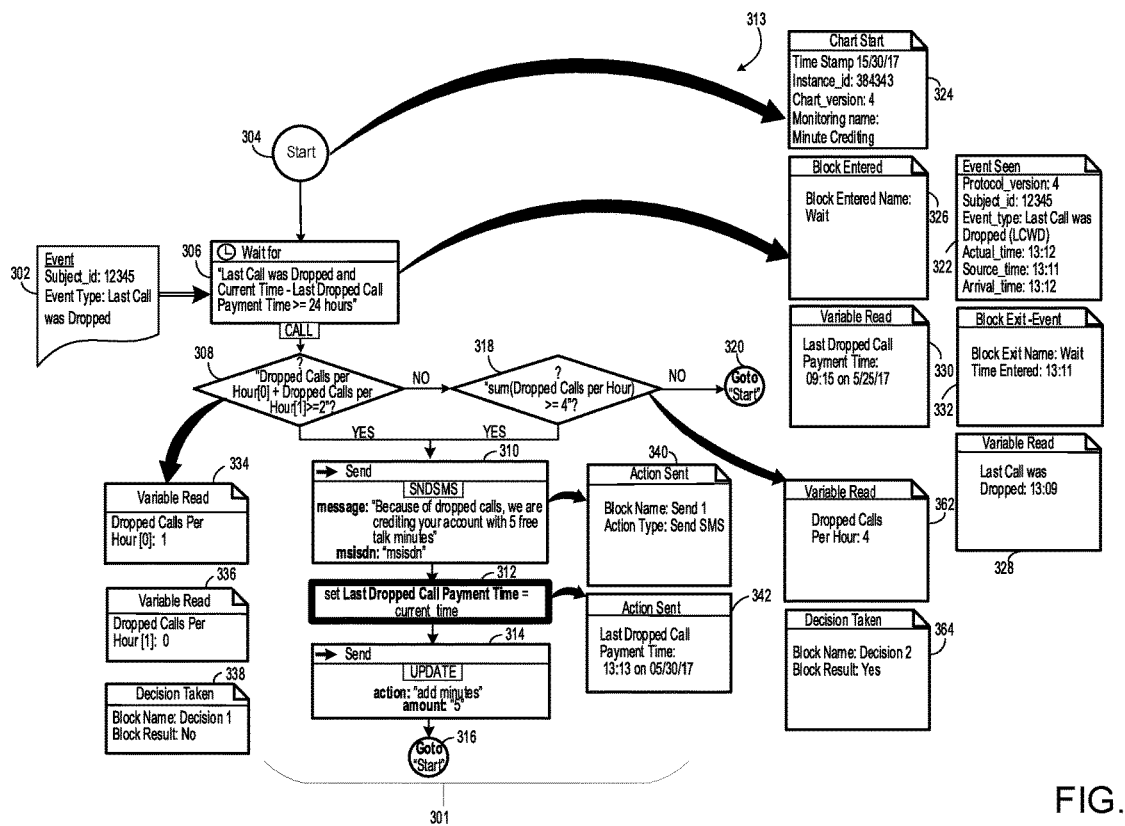

Referring to FIG. 7F, diagram 311 illustrates that the chart 301 has progressed to component 310, which generates audit record 340. Referring to FIG. 7G, diagram 313 illustrates that the chart 301 then progresses to component 312, which generates audit record 342.

Figure 7H:
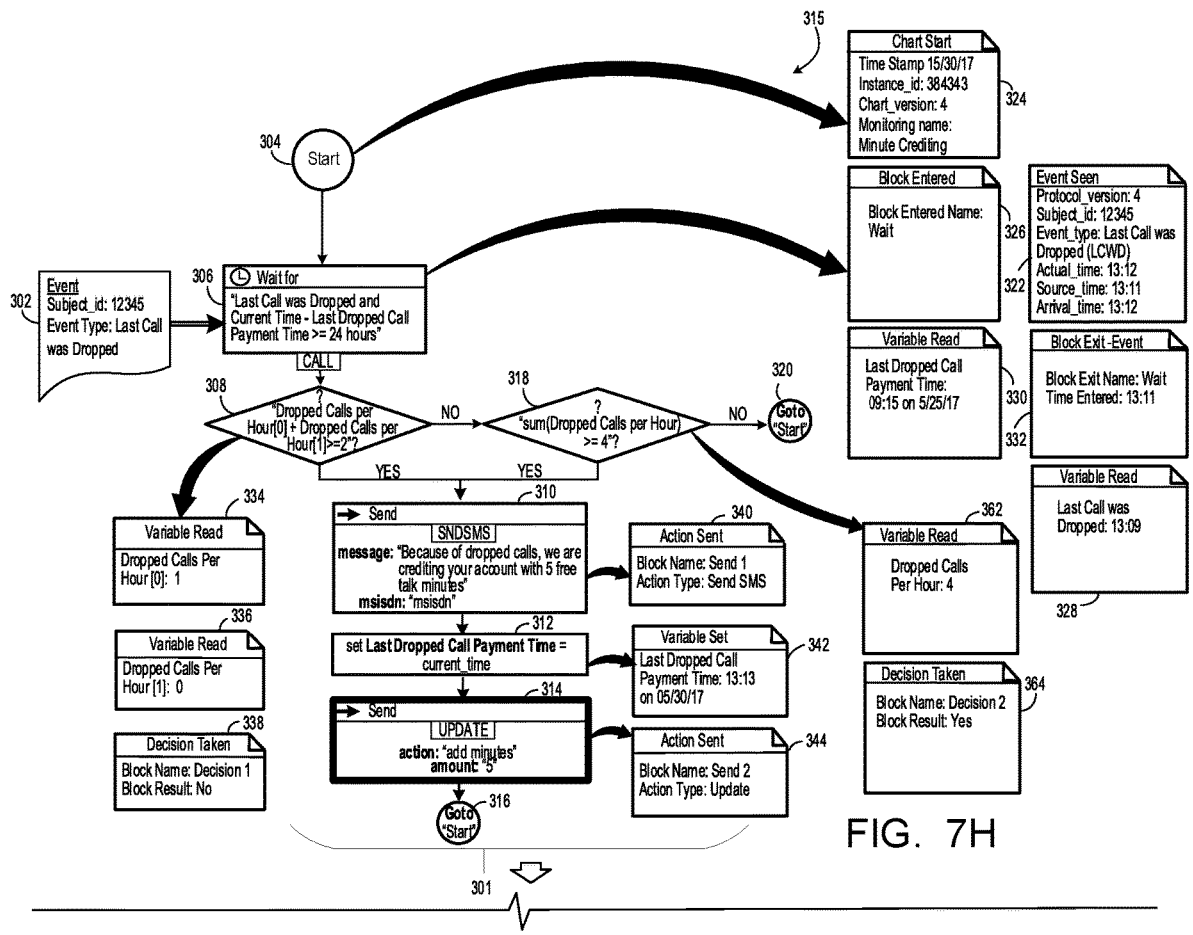

Referring to FIG. 7H, diagram 315 illustrates that the chart 301 then progresses to component 314, which generates audit record 344. The chart 301 then progresses to component 316. In this example, the system batches audit records 322, 324, 326, 328, 330, 332, 334, 336, 338, 340, 342, 344, 362, 364 together, identifies key fields that will be stored in an ICFF record (e.g., fields for event type, subject ID, timestamp, instance ID) and then groups the remaining audit records together in a collection. In this example, the system generates ICFF record 348 that include the keys fields, e.g., from audit records 322, 324. The contents of audit records 326, 328, 330, 332, 334, 336, 338, 340, 342, 344, 362, 364 and the contents of audit records 322, 324 that are not included in ICFF record 348 are included in data block 350. The system stores ICFF record 348 and data block 350 in database 346. In this example, database 346 stores index 352 and ICFF record 348 is indexed in index 352 by the following fields: timestamp, subject_ID, and event type, as shown in row 354 of index 352. In this example, index 352 also includes rows 356, 358, 360 that index other ICFF records, e.g., for other charts and/or for other subject IDs. In this example, ICFF records 348 references data block 350 via referential data structure 366 (e.g., a pointer). In a variation, ICFF record 348 and block of data 350 are combined into a ICFF block of data (or a block of data) that is indexed.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of charts and flowcharts. The nodes, links and elements of the chart can be implemented as data structures stored in a computer readable medium or other organized data conforming to a data model stored in a data repository.

The techniques described herein can be implemented in digital electronic circuitry, or in computer hardware, firmware, software, or in combinations thereof. An apparatus can be implemented in a computer program product tangibly embodied or stored in a machine-readable storage device (e.g., a non-transitory machine-readable storage device, a machine-readable hardware storage device, and so forth) for execution by a programmable processor; and method actions can be performed by a programmable processor executing a program of instructions to perform functions by operating on input data and generating output. The embodiments described herein, and other embodiments of the claims and the techniques described herein, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description and the claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments of the invention have been described. Nevertheless, it will be understood by one of ordinary skill in the art that various modifications may be made without departing from the spirit and scope of the claims and the techniques described herein.

What is claimed is:

1. A method implemented by a data processing system for identifying one or more portions of executable logic of respective one or more sets of executable logic that are executed in processing one or more data items, wherein the one or more data items are each associated with a given value of a key, wherein the executable logic is represented as a specification that includes a chart, and the respective one or more sets of executable logic represent respective one or more implementations of executable logic, the method including:

for each of the respective values of the key, accessing one or more keyed data structures that maintain a state of the specification for the respective value of the key, wherein each keyed data structure is associated with a value of the key to maintain states of the specification for respective values of the key;

accessing the specification, wherein a state of the specification for a value of the key identifies a respective location along a path of the chart, with the respective location along the path representing one or more portions of the one or more sets of executable logic that are invokeable in that state and that are used to process one or more data records associated with the value of the key;

intermittently receiving, over an input device or port, data items of a stream of data, with one or more of the data items each being associated with the given value of the key; and for each set of executable logic, generating a log record for the given value of the key, with the log record specifying one or more portions of executable logic that are identified from the one or more keyed data structures for the given value of the key and that are executed in processing the one or more of the data items that are each associated with the given value of the key, the generating including:

for each of the one or more of the data items associated with the given value of the key:

identifying, from the one or more keyed data structures for the given value of the key, a given state of the specification for the given value of the key associated with that data item;

processing, by the data processing system, that data item including executing, on that data item, one or more portions of executable logic that are specified in the given state identified from the one or more keyed data structures for the given value of the key; and generating the log record specifying the execution of those one or more portions of the executable logic identified from the one or more keyed data structures for that given value of the key;

wherein one or more log records are one or more structured data records with one or more first fields for storing data representing a state of the specification for a particular value of the key and one or more second fields for storing data specifying portions of the executable logic represented by the specification that have been executed, based on a time at which execution of the executable logic is started to a given time, for that particular value of the key.

2. The method of claim 1, further comprising grouping log records together by key, wherein first log records associated with a first key are grouped into a first group and wherein second log records associated with a second key are grouped into a second group.

3. The method of claim 2, wherein the log records are grouped in memory.

4. The method of claim 2, wherein each log record includes one or more fields indicative of one or more attributes of processing a data item, wherein, for at least one log record, a field is a key field specifying a value of key associated with the data item.

5. The method of claim 4, wherein a subset of log records associated with a particular key do not include the key field.

6. The method of claim 4, wherein only one log record associated with a particular key includes the key field.

7. The method of claim 2, further comprising:
writing log records in a particular group associated with a particular key to a file at an end of pre-defined time interval.

8. The method of claim 7, further comprising:
reformatting the file;
writing the reformatted file into an indexed compressed flat file (ICFF); and
indexing the ICFF in an index by key.

9. The method of claim 1, wherein the specification comprises a chart with a plurality of nodes, wherein each node represents one or more portions of the executable logic, wherein the chart is executable, wherein execution of the chart causes execution of portions of the executable logic, and wherein the method further comprises:
based on the log records, tracing traversal through one or more nodes the chart in processing one or more data items.

10. The method of claim 9, further comprising:
parsing the log records to identify which nodes of the chart are traversed and which nodes of the chart are not traversed.

11. The method of claim 10, wherein the log records specify which nodes of the chart are traversed and which nodes of the chart are not traversed.

12. The method of claim 9, further including:
receiving a user-initiated selection of one of the nodes;
in response to receiving the selection, causing a configuration area to be displayed on a graphical user interface that provides a configuration means for the user to configure the one or more portions of the executable logic represented by selected node, wherein the configuration means includes means to turn on and off auditing; and
receiving user-initiated turning on of the auditing via the configuration means causing the generating of the log record that is associated with the selected node.

13. The method of claim 9, further including:
dynamically determining metrics indicative of which nodes of the chart are traversed and how many times the traversed nodes are traversed by the data items.

14. The method of claim 13, further including:
dynamically outputting the determined metrics via a user interface, wherein the outputted metrics are updated in response to a change to the determined metrics.

15. The method of claim 1, wherein the generating of the log record specifying the execution of those one or more portions of the executable logic for that given value of the key includes:
specifying in the generated log record an outcome of the execution of those one or more portions of the executable logic, specifying variables that are read or set upon the execution of those one or more portions of the executable logic, or identifying those one or more portions of the executable logic that are executed.

16. The method of claim 1, further including:
in response to executing the one or more portions of the executable logic, initiating an action to be executed by a computing system.

17. The method of claim 16, wherein the action includes requesting additional computational resources for the execution of the one or more portions of executable logic based on an execution characteristic of the execution of the one or more portions of executable logic.

18. The method of claim 1, further including:
maintaining the states by storing, in a data repository or in an in-memory data grid, state data indicative of which portion of the executable logic is currently being executed for each state.

19. The method of claim 18, further including:
in response to completing the processing of the one or more of the data items that are each associated with the given value of the key, updating the state data to specify a current state for that value of the key.

20. The method of claim 1, further including:
generating a stream of log records documenting paths taken through the chart;
transforming the generated log records; and
storing the transformed log records in a relational database or in an index compressed flat file including batching log records together at a specified granularity.

21. The method of claim 1, further including:
receiving a user selection of a first one of the data items of the stream; and
causing display of an indication of the one or more portions of the executable logic currently being executed on the selected first one of the data items.

22. The method of claim 21, further including:
comparing the selected first one of the data items of the stream currently being processed with a predetermined reference data item;
determining if a deviation exists between the first one of the data items of the stream currently being processed and the predetermined reference data item or if such a deviation does not exist; and
outputting an indication whether the first one of the data items of the stream currently being processed is in agreement with the predetermined reference data item based on the determining if a deviation exists between the first one of the data items of the stream currently being processed and the predetermined reference data item or if such a deviation does not exist.

23. The method of claim 21, further including:
comparing the one or more portions of the executable logic currently being executed on the first one of the data items with a predetermined reference executable logic;
determining if a deviation exists between the one or more portions of the executable logic currently being executed on the first one of the data items and the predetermined reference executable logic or if such a deviation does not exist; and
outputting an indication whether the or more portions of the executable logic currently being executed on the first one of the data items is in agreement with the predetermined reference executable logic based on the determining if a deviation exists between the one or more portions of the executable logic currently being executed on the first one of the data items and the predetermined reference executable logic or if such a deviation does not exist.

24. The method of claim 1, wherein a log record is a structured data record with a field for storing data specifying which portion of the executable logic represented by the specification has been executed at a current time for a particular value of the key.

25. The method of claim 1, wherein the specification is a chart, and wherein one or more log records specify a path through the chart that represents which portions of the executable logic are executed in processing one or more data records associated with a particular value of the key.

26. The method of claim 1, further including:
generating one or more output records based on processing of one or data items;
wherein each of the one or more output records includes data not included in the log record.

27. A data processing system for identifying one or more portions of executable logic of respective one or more sets of executable logic that are executed in processing one or more data items, wherein the one or more data items are each associated with a given value of a key, wherein the executable logic is represented as a specification that includes a chart, and the respective one or more sets of executable logic represent respective one or more implementations of executable logic, the data processing system including:
one or more processors; and
one or more non-transitory machine-readable hardware storage devices storing instructions that are executable by the one or more processing devices to perform operations including:
for each of the respective values of the key, accessing one or more keyed data structures that maintain a state of the specification for the respective value of the key, wherein each keyed data structure is associated with a value of the key to maintain states of the specification for respective values of the key;
accessing the specification, wherein a state of the specification for a value of the key identifies a respective location along a path of the chart, with the respective location along the path representing one or more portions of the one or more sets of executable logic that are invokeable in that state and that are used to process one or more data records associated with the value of the key;
intermittently receiving, over an input device or port, data items of a stream of data, with one or more of the data items each being associated with the given value of the key; and
for each set of executable logic, generating a log record for the given value of the key, with the log record specifying one or more portions of executable logic that are identified from the one or more keyed data structures for the given value of the key and that are executed in processing the one or more of the data items that are each associated with the given value of the key, the generating including:
for each of the one or more of the data items associated with the given value of the key:
identifying, from the one or more keyed data structures for the given value of the key, a given state of the specification for the given value of the key associated with that data item;
processing, by the data processing system, that data item including executing, on that data item, one or more portions of executable logic that are specified in the given state identified from the one or more keyed data structures for the given value of the key; and
generating the log record specifying the execution of those one or more portions of the executable logic identified from the one or more keyed data structures for that given value of the key;
wherein one or more log records are one or more structured data records with one or more first fields for storing data representing a state of the specification for a particular value of the key and one or more second fields for storing data specifying portions of the executable logic represented by the specification that have been executed, based on a time at which execution of the executable logic is started to a given time, for that particular value of the key.

28. The data processing system of claim 27, wherein the operations further include grouping log records together by key, wherein first log records associated with a first key are grouped into a first group and wherein second log records associated with a second key are grouped into a second group.

29. The data processing system of claim 28, wherein the log records are grouped in memory.

30. The data processing system of claim 28, wherein each log record includes one or more fields indicative of one or more attributes of processing a data item, wherein, for at least one log record, a field is a key field specifying a value of key associated with the data item.

31. The data processing system of claim 30, wherein a subset of log records associated with a particular key do not include the key field.

32. The data processing system of claim 30, wherein only one log record associated with a particular key includes the key field.

33. The data processing system of claim 27, wherein the operations further include:
writing log records in a particular group associated with a particular key to a file at an end of pre-defined time interval.

34. The data processing system of claim 33, wherein the operations further include:
reformatting the file;
writing the reformatted file into an indexed compressed flat file (ICFF); and
indexing the ICFF in an index by key.

35. The data processing system of claim 27, wherein the specification includes a chart with a plurality of nodes, wherein each node represents one or more portions of the executable logic, wherein the chart is executable, wherein execution of the chart causes execution of portions of the executable logic, and wherein the operations further include:
based on the log records, tracing traversal through one or more nodes the chart in processing one or more data items.

36. The data processing system of claim 35, wherein the operations further include:
parsing the log records to identify which nodes of the chart are traversed and which nodes of the chart are not traversed.

37. The data processing system of claim 36, wherein the log records specify which nodes of the chart are traversed and which nodes of the chart are not traversed.

38. The data processing system of claim 35, wherein the operations further include:
receiving a user-initiated selection of one of the nodes;
in response to receiving the selection, causing a configuration area to be displayed on a graphical user interface that provides a configuration means for the user to configure the one or more portions of the executable logic represented by selected node, wherein the configuration means includes means to turn on and off auditing; and
receiving user-initiated turning on of the auditing via the configuration means causing the generating of the log record that is associated with the selected node.

39. The data processing system of claim 35, wherein the operations further include:
dynamically determining metrics indicative of which nodes of the chart are traversed and how many times the traversed nodes are traversed by the data items.

40. The data processing system of claim 27, wherein the generating of the log record specifying the execution of those one or more portions of the executable logic for that given value of the key includes:
specifying in the generated log record an outcome of the execution of those one or more portions of the executable logic, specifying variables that are read or set upon the execution of those one or more portions of the executable logic, or identifying those one or more portions of the executable logic that are executed.

41. The data processing system of claim 27, wherein the operations further include: in response to executing the one or more portions of the executable logic, initiating an action to be executed by a computing system.

42. The data processing system of claim 41, wherein the action includes requesting additional computational resources for the execution of the one or more portions of executable logic based on an execution characteristic of the execution of the one or more portions of executable logic.

43. The data processing system of claim 27, wherein the operations further include: maintaining the states by storing, in a data repository or in an in-memory data grid, state data indicative of which portion of the executable logic is currently being executed for each state.

44. The data processing system of claim 43, wherein the operations further include: in response to completing the processing of the one or more of the data items that are each associated with the given value of the key, updating the state data to specify a current state for that value of the key.

45. The data processing system of claim 27, wherein the operations further include:
generating a stream of log records documenting paths taken through the chart;
transforming the generated log records; and
storing the transformed log records in a relational database or in an index compressed flat file including batching log records together at a specified granularity.

46. The data processing system of claim 45, wherein the operations further include:
dynamically outputting the determined metrics via a user interface, wherein the outputted metrics are updated in response to a change to the determined metrics.

47. The data processing system of claim 27, wherein the operations further include:
receiving a user selection of a first one of the data items of the stream; and
causing display of an indication of the one or more portions of the executable logic currently being executed on the selected first one of the data items.

48. The data processing system of claim 47, wherein the operations further include:
comparing the selected first one of the data items of the stream currently being processed with a predetermined reference data item;
determining if a deviation exists between the first one of the data items of the stream currently being processed and the predetermined reference data item or if such a deviation does not exist; and
outputting an indication whether the first one of the data items of the stream currently being processed is in agreement with the predetermined reference data item based on the determining if a deviation exists between the first one of the data items of the stream currently being processed and the predetermined reference data item or if such a deviation does not exist.

49. The data processing system of claim 48, wherein the operations further include:
comparing the one or more portions of the executable logic currently being executed on the first one of the data items with a predetermined reference executable logic;
determining if a deviation exists between the one or more portions of the executable logic currently being executed on the first one of the data items and the predetermined reference executable logic or if such a deviation does not exist; and
outputting an indication whether the or more portions of the executable logic currently being executed on the first one of the data items is in agreement with the predetermined reference executable logic based on the determining if a deviation exists between the one or more portions of the executable logic currently being executed on the first one of the data items and the predetermined reference executable logic or if such a deviation does not exist.

50. The data processing system of claim 27, wherein a log record is a structured data record with a field for storing data specifying which portion of the executable logic represented by the specification has been executed at a current time for a particular value of the key.

51. The data processing system of claim 27, wherein the specification is a chart, and wherein one or more log records specify a path through the chart that represents which portions of the executable logic are executed in processing one or more data records associated with a particular value of the key.

52. The data processing system of claim 27, wherein the operations further include:
generating one or more output records based on processing of one or data items;
wherein each of the one or more output records includes data not included in the log record.

53. One or more non-transitory machine-readable hardware storage devices for identifying one or more portions of executable logic of respective one or more sets of executable logic that are executed in processing one or more data items, wherein the one or more data items are each associated with a given value of a key, wherein the executable logic is represented as a specification that includes a chart, and the respective one or more sets of executable logic represent respective one or more implementations of executable logic, the one or more non-transitory machine-readable hardware storage devices storing instructions that are executable by one or more processing devices to perform operations including:
for each of the respective values of the key, accessing one or more keyed data structures that maintain a state of the specification for the respective value of the key, wherein each keyed data structure is associated with a value of the key to maintain states of the specification for respective values of the key;
accessing the specification, wherein a state of the specification for a value of the key identifies a respective location along a path of the chart, with the respective location along the path representing one or more portions of the one or more sets of executable logic that are invokeable in that state and that are used to process one or more data records associated with the value of the key;
intermittently receiving, over an input device or port, data items of a stream of data, with one or more of the data items each being associated with the given value of the key; and
for each set of executable logic, generating a log record for the given value of the key, with the log record specifying one or more portions of executable logic that are identified from the one or more keyed data structures for the given value of the key and that are executed in processing the one or more of the data items that are each associated with the given value of the key, the generating including:
for each of the one or more of the data items associated with the given value of the key:
identifying, from the one or more keyed data structures for the given value of the key, a given state of the specification for the given value of the key associated with that data item;
processing, by the data processing system, that data item including executing, on that data item, one or more portions of executable logic that are specified in the given state identified from the one or more keyed data structures for the given value of the key; and
generating the log record specifying the execution of those one or more portions of the executable logic identified from the one or more keyed data structures for that given value of the key;
wherein one or more log records are one or more structured data records with one or more first fields for storing data representing a state of the specification for a particular value of the key and one or more second fields for storing data specifying portions of the executable logic represented by the specification that have been executed, based on a time at which execution of the executable logic is started to a given time, for that particular value of the key.

54. The one or more non-transitory machine-readable hardware storage devices of claim 53, wherein the operations further include grouping log records together by key, wherein first log records associated with a first key are grouped into a first group and wherein second log records associated with a second key are grouped into a second group.

55. The one or more non-transitory machine-readable hardware storage devices of claim 54, wherein the log records are grouped in memory.

56. The one or more non-transitory machine-readable hardware storage devices of claim 54, wherein each log record includes one or more fields indicative of one or more attributes of processing a data item, wherein, for at least one log record, a field is a key field specifying a value of key associated with the data item.

57. The one or more non-transitory machine-readable hardware storage devices of claim 56, wherein a subset of log records associated with a particular key do not include the key field.

58. The one or more non-transitory machine-readable hardware storage devices of claim 56, wherein only one log record associated with a particular key includes the key field.

59. The one or more non-transitory machine-readable hardware storage devices of claim 53, wherein the operations further include:
writing log records in a particular group associated with a particular key to a file at an end of pre-defined time interval.

60. The one or more non-transitory machine-readable hardware storage devices of claim 59, wherein the operations further include:
reformatting the file;
writing the reformatted file into an indexed compressed flat file (ICFF); and
indexing the ICFF in an index by key.

61. The one or more non-transitory machine-readable hardware storage devices of claim 53, wherein the specification includes a chart with a plurality of nodes, wherein each node represents one or more portions of the executable logic, wherein the chart is executable, wherein execution of the chart causes execution of portions of the executable logic, and wherein the operations further include:
based on the log records, tracing traversal through one or more nodes the chart in processing one or more data items.

62. The one or more non-transitory machine-readable hardware storage devices of claim 61, wherein the operations further include:
parsing the log records to identify which nodes of the chart are traversed and which nodes of the chart are not traversed.

63. The one or more non-transitory machine-readable hardware storage devices of claim 62, wherein the log records specify which nodes of the chart are traversed and which nodes of the chart are not traversed.

64. The one or more non-transitory machine-readable hardware storage devices of claim 63, wherein the operations further include:
receiving a user-initiated selection of one of the nodes;
in response to receiving the selection, causing a configuration area to be displayed on a graphical user interface that provides a configuration means for the user to configure the one or more portions of the executable logic represented by selected node, wherein the configuration means includes means to turn on and off auditing; and
receiving user-initiated turning on of the auditing via the configuration means causing the generating of the log record that is associated with the selected node.

65. The one or more non-transitory machine-readable hardware storage devices of claim 53, wherein the generating of the log record specifying the execution of those one or more portions of the executable logic for that given value of the key includes:
specifying in the generated log record an outcome of the execution of those one or more portions of the executable logic, specifying variables that are read or set upon the execution of those one or more portions of the executable logic, or identifying those one or more portions of the executable logic that are executed.

66. The one or more non-transitory machine-readable hardware storage devices of claim 53 wherein the operations further include: in response to executing the one or more portions of the executable logic, initiating an action to be executed by a computing system.

67. The one or more non-transitory machine-readable hardware storage devices of claim 66, wherein the action includes requesting additional computational resources for the execution of the one or more portions of executable logic based on an execution characteristic of the execution of the one or more portions of executable logic.

68. The one or more non-transitory machine-readable hardware storage devices of claim 29, wherein the operations further include:
maintaining the states by storing, in a data repository or in an in-memory data grid, state data indicative of which portion of the executable logic is currently being executed for each state.

69. The one or more non-transitory machine-readable hardware storage devices of claim 68, wherein the operations further include:
in response to completing the processing of the one or more of the data items that are each associated with the given value of the key, updating the state data to specify a current state for that value of the key.

70. The one or more non-transitory machine-readable hardware storage devices of claim 69, wherein the operations further include:
dynamically determining metrics indicative of which nodes of the chart are traversed and how many times the traversed nodes are traversed by the data items.

71. The one or more non-transitory machine-readable hardware storage devices of claim 53, wherein the operations further include:
generating a stream of log records documenting paths taken through the chart;
transforming the generated log records; and
storing the transformed log records in a relational database or in an index compressed flat file including batching log records together at a specified granularity.

72. The one or more non-transitory machine-readable hardware storage devices of claim 71, wherein the operations further include:
dynamically outputting the determined metrics via a user interface, wherein the outputted metrics are updated in response to a change to the determined metrics.

73. The one or more non-transitory machine-readable hardware storage devices of claim 53, wherein the operations further include:
receiving a user selection of a first one of the data items of the stream; and
causing display of an indication of the one or more portions of the executable logic currently being executed on the selected first one of the data items.

74. The one or more non-transitory machine-readable hardware storage devices of claim 73, wherein the operations further include:
comparing the selected first one of the data items of the stream currently being processed with a predetermined reference data item;
determining if a deviation exists between the first one of the data items of the stream currently being processed and the predetermined reference data item or if such a deviation does not exist; and
outputting an indication whether the first one of the data items of the stream currently being processed is in agreement with the predetermined reference data item based on the determining if a deviation exists between the first one of the data items of the stream currently being processed and the predetermined reference data item or if such a deviation does not exist.

75. The one or more non-transitory machine-readable hardware storage devices of claim 74, wherein the operations further include:
comparing the one or more portions of the executable logic currently being executed on the first one of the data items with a predetermined reference executable logic;
determining if a deviation exists between the one or more portions of the executable logic currently being executed on the first one of the data items and the predetermined reference executable logic or if such a deviation does not exist; and outputting an indication whether the or more portions of the executable logic currently being executed on the first one of the data items is in agreement with the predetermined reference executable logic based on the determining if a deviation exists between the one or more portions of the executable logic currently being executed on the first one of the data items and the predetermined reference executable logic or if such a deviation does not exist.

76. The one or more non-transitory machine-readable hardware storage devices of claim 53, wherein a log record is a structured data record with a field for storing data specifying which portion of the executable logic represented by the specification has been executed at a current time for a particular value of the key.

77. The one or more non-transitory machine-readable hardware storage devices of claim 53, wherein the specification is a chart, and wherein one or more log records specify a path through the chart that represents which portions of the executable logic are executed in processing one or more data records associated with a particular value of the key.

78. The one or more non-transitory machine-readable hardware storage devices of claim 53, wherein the operations further include:

generating one or more output records based on processing of one or data items;

wherein each of the one or more output records includes data not included in the log record.

* * * * *